United States Patent
Chen et al.

(10) Patent No.: US 8,903,005 B2
(45) Date of Patent: Dec. 2, 2014

(54) METHOD FOR SENDING CHANNEL INFORMATION, AND A TERMINAL, A BASE STATION AND AN LTE-A SYSTEM

(75) Inventors: Yijian Chen, Shenzhen (CN); Yu Ngok Li, Shenzhen (CN); Jun Xu, Shenzhen (CN); Shupeng Li, Shenzhen (CN); Junfeng Zhang, Shenzhen (CN)

(73) Assignee: ZTE Corporation (CN)

( * ) Notice: Subject to any disclaimer, the term of this patent is extended or adjusted under 35 U.S.C. 154(b) by 17 days.

(21) Appl. No.: 13/817,179

(22) PCT Filed: Jul. 15, 2011

(86) PCT No.: PCT/CN2011/077191
§ 371 (c)(1),
(2), (4) Date: Feb. 15, 2013

(87) PCT Pub. No.: WO2012/022208
PCT Pub. Date: Feb. 23, 2012

(65) Prior Publication Data
US 2013/0243108 A1    Sep. 19, 2013

(30) Foreign Application Priority Data

Aug. 16, 2010   (CN) .......................... 2010 1 0259081

(51) Int. Cl.
| | | |
|---|---|---|
| H04B 7/02 | (2006.01) | |
| H04B 7/06 | (2006.01) | |
| H04L 25/03 | (2006.01) | |
| H04B 7/04 | (2006.01) | |

(52) U.S. Cl.
CPC .............. *H04B 7/0417* (2013.01); *H04B 7/063* (2013.01); *H04B 7/0639* (2013.01); *H04L 25/03343* (2013.01)
USPC ......................................................... 375/267

(58) Field of Classification Search
USPC .......... 375/260, 267, 285, 295, 316; 370/328, 370/334
See application file for complete search history.

(56) References Cited

U.S. PATENT DOCUMENTS

| | | | |
|---|---|---|---|
| 8,432,819 B2 * | 4/2013 | Chun et al. ..................... 370/252 |
| 8,457,235 B2 * | 6/2013 | Ko et al. ........................ 375/267 |
| 2009/0207784 A1 | 8/2009 | Lee et al. | |
| 2011/0164696 A1* | 7/2011 | Choi et al. ..................... 375/260 |
| 2011/0194551 A1* | 8/2011 | Lee et al. ....................... 370/342 |

FOREIGN PATENT DOCUMENTS

| | | |
|---|---|---|
| CN | 101667857 A | 3/2010 |
| CN | 102013953 A | 4/2011 |
| WO | 2009157715 A2 | 12/2009 |

OTHER PUBLICATIONS

International Search Report for corresponding application PCT/CN2011/077191 filed Jul. 15, 2011; mail date Oct. 20, 2011.
European Search Report for corresponding application EP 11 81 7735; Dated Nov. 7, 2013.

* cited by examiner

*Primary Examiner* — Khanh C Tran
(74) *Attorney, Agent, or Firm* — Cantor Colburn LLP

(57) ABSTRACT

The present invention discloses a method for sending channel information, and a terminal, a base station and an LTE-A system. The method comprises: a mobile terminal acquiring channel information; determining, in a codebook space, an RI and a PMI corresponding to the channel information according to the channel information; and sending the RI and the PMI to a base station. By way of the present invention, the effects of improving the throughput of an LTE-A system and the frequency spectrum efficiency thereof are achieved.

18 Claims, 2 Drawing Sheets

METHOD FOR SENDING CHANNEL INFORMATION, AND A TERMINAL, A BASE STATION AND AN LTE-A SYSTEM

FIELD OF THE INVENTION

The present invention relates to the communication field, and specifically to a method for sending channel information, and a terminal, a base station and a Long-term Evolution Advance (LTE-A) system.

BACKGROUND OF THE INVENTION

In a wireless communication system, a sending terminal and a receiving terminal use multiple antennae to obtain a higher speed in a manner of spatial multiplexing. Compared to general spatial multiplexing manner, an enhanced technology is one that the receiving terminal feeds channel information back to the sending terminal which uses some transmission precoding technologies according to the channel information acquired, thus improving the transmission performance significantly. For single-user Multi-Input Multi-Output (MIMO), precoding is performed by directly using channel characteristic vector information; while for multiple-user MIMO, more precise channel information is required.

The channel information is fed back mainly through a simple single codebook feedback method in the Long Term Evolution (LTE), while the performance of the MIMO transmission precoding technology depends more on the feedback accuracy of the codebook adopted.

In the related art, the basic principle of the quantized feedback of the codebook-based channel information is as follows.

Assuming that a limited feedback channel capacity is B bps/Hz, then the number of available code words is. $N=2^B$. The characteristic vector space of a channel matrix constructs a codebook space $\Re = \{F_1, F_2, \ldots F_N\}$ through quantization. The sending and receiving terminals store the codebook together or generate the codebook in real time (the sending and receiving terminals use the same codebook). For a channel estimate value H realized for the channel each time, the receiving terminal selects, from $\Re$, a code word $\hat{F}$ most matching with the channel according to certain rules and feeds the serial number i of the code word back to the sending terminal. The serial number of the code word is called Pre-coding Matrix Indicator (PMI) herein. The sending terminal finds the corresponding precoding code word $\hat{F}$ according to the serial number i of the code word, thus obtaining the corresponding channel information, wherein $\hat{F}$ represents the characteristic vector information of the channel.

Generally, the codebook space $\Re$ can be further divided into the codebook corresponding to multiple Ranks (number of layers), wherein each Rank corresponds to multiple code words for quantizing the precoding matrix composed of the channel characteristic vectors under the Rank. Since the Rank of the channel is equal to the number of non-zero characteristic vectors, there will be N columns of code words when the Rank is N. Therefore, the codebook space $\Re$ can be divided into multiple sub-codebooks according to the Rank, as shown in Table 1.

TABLE 1

Schematic table of dividing the codebook into multiple sub-codebooks according to the Rank

| $\Re$ number of layers $\upsilon$ (Rank) | | |
|---|---|---|
| 2 | ... | N |
| $\Re_1$ set of code word vectors with 1 column | $\Re_2$ set of code word matrixes with 2 columns | ... $\Re_N$ set of code word matrixes with N columns |

Wherein, when the Rank>1, all the code words required to be stored are in the form of matrix. The codebook in the LTE protocol uses this codebook quantization feedback method. The codebook for downlink 4 transmitting antennae in the LTE is as shown in Table 2. In fact, the precoding codebook in the LTE has the same meaning with the channel information quantization codebook. For uniformity's sake, the vector can be regarded as a matrix with a dimension of 1 in this application.

TABLE 2

Schematic table of codebook for downlink 4 transmitting antennae in LTE

| Codebook Index $u_n$ | | Total number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In the above, $W_n = I - 2u_n u_n^H / u_n^H u_n$, I is an identity matrix, $W_k^{(j)}$ represents the vector of Column j of Matrix $W_k$, and $W_k^{(j_1, j_2, \cdots j_n)}$ represents the matrix composed of Columns $j_1$, $j_2, \ldots j_n$ of Matrix $W_k$.

The above is the basic principle of the codebook feedback technology. In the practical application of the system, some specific parameters may be involved. In the LTE standard, the minimum feedback unit of the channel information is a Subband; one Subband is composed of several resource blocks (RB) which consists of multiple resource elements (RE), wherein an RE is the minimum unit of the time frequency resources in the LTE system. The resource expression method of LTE is still used in the LTE-A. The object of the channel information feedback of the user equipment can be anyone of the Subband, multiple Subbands (Multi-Subband) and Wideband.

The feedback of the channel state information comprises: a Channel Quality Indication (CQI), a Precoding Matrix Indicator (PMI) and a Rank Indicator (RI).

PMI represents characteristic vector information, and it is sent to the base station to be used for the downlink precoding technology.

RI is used to describe the number of the space independent channels, and corresponds to the Rank of a channel response matrix. In open-loop and closed-loop spatial multiplexing modes, the RI information is required to be fed back by the UE, while in other modes, the RI information is not required to be fed back. The Rank of the channel matrix corresponds to the number of layers.

CQI is an indication for evaluating the quality of the downlink channel. In the 3GPP 36-213 protocol, CQI is expressed by the integral values within 0~15, representing different CQI levels respectively, wherein different CQIs correspond to their own Modulation Codes and coding rates (Modulate Code format Set, MCS). The CQI can be fed back together with the PMI.

With the development of the communication technology, the LTE-Advance system has a higher requirement for the frequency spectrum efficiency. Therefore, the number of antennae is increased to 8. At present, the codebook for 4 antennae in the LTE system can not realize the channel information feedback in the LTE-A using 8 antennae.

SUMMARY OF THE INVENTION

The present invention mainly provides a method for sending channel information, and a terminal, a base station and an LTE-A system, so as to at least solve the problem above that the codebook for 4 antennae in the LTE system can not realize the channel information feedback in the LTE-A system using 8 annotate.

According to one aspect of the present invention, a method for sending channel information is provided.

The method for sending channel information according to the present invention comprises: a mobile terminal acquiring channel information; according to the channel information, determining, in a codebook space, a Rank Indicator (RI) and a Precoding Matrix Indicator (PMI) corresponding to the channel information; and sending the RI and the PMI to a base station.

After the step of sending the RI and the PMI to the base station, the method further comprises: the base station acquiring the RI and the PMI; and performing downlink precoding operation according to the RI and the PMI.

The codebook space is stored in both the mobile terminal and the base station.

When the RI is equal to 8, a codebook space $\mathfrak{R}_8$ is constructed by selecting any 2, 4, 8 or 16 matrixes from a set as follows:

the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$

$$\begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$

$$\left. \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\},$$

wherein $X_1 = \begin{bmatrix} 1 & 1 & 1 & 1 \\ 1 & j & -1 & -j \\ 1 & -1 & 1 & -1 \\ 1 & -j & -1 & j \end{bmatrix}$, $X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix}$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

When the RI is equal to 7, a codebook space $\mathfrak{R}_7$ is constructed by selecting any 2, 4, 8 or 16 matrixes from a set as follows:

the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$

$$\begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix},$$

$$\begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix},$$

$$\begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix}, \begin{bmatrix} Z_4 & X_4 \\ -jZ_4 & jX_4 \end{bmatrix},$$

$$\bigcup_{m=1, m \neq n}^{4} \bigcup_{n=1}^{4} \begin{bmatrix} Z_m & X_n \\ Z_m & -X_n \end{bmatrix}, \bigcup_{m=1, m \neq n}^{4} \bigcup_{n=1}^{4} \begin{bmatrix} Z_m & X_n \\ -Z_m & X_n \end{bmatrix},$$

$$\left. \bigcup_{m=1, m \neq n}^{4} \bigcup_{n=1}^{4} \begin{bmatrix} Z_m & X_n \\ -jZ_m & jX_n \end{bmatrix}, \bigcup_{m=1, m \neq n}^{4} \bigcup_{n=1}^{4} \begin{bmatrix} Z_m & X_n \\ jZ_m & -jX_n \end{bmatrix} \right\},$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

When the RI is equal to 6, a codebook space $\Re_6$ is constructed by selecting any 2, 4, 8 or 16 matrixes from a set as follows:
the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \right.$$
$$\begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$
$$\left. \bigcup_{m=1,m\neq n}^{4} \bigcup_{n=1}^{4} \begin{bmatrix} Z_m & Z_n \\ Z_m & -Z_n \end{bmatrix}, \bigcup_{m=1,m\neq n}^{4} \bigcup_{n=1}^{4} \begin{bmatrix} Z_m & Z_n \\ jZ_m & -jZ_n \end{bmatrix} \right\},$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

When the RI is equal to 5, a codebook space $\Re_5$ is constructed by selecting any 2, 4, 8 or 16 matrixes from a set as follows,
the set is $$\left\{ \begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \begin{bmatrix} Z_2 & M_2 \\ -Z_2 & M_2 \end{bmatrix}, \right.$$

-continued
$$\begin{bmatrix} Z_1 & M_1 \\ jZ_1 & -jM_1 \end{bmatrix}, \begin{bmatrix} Z_1 & M_1 \\ -jZ_1 & jM_1 \end{bmatrix}, \begin{bmatrix} Z_2 & M_2 \\ jZ_2 & -jM_2 \end{bmatrix}, \begin{bmatrix} Z_2 & M_2 \\ -jZ_2 & jM_2 \end{bmatrix},$$
$$\begin{bmatrix} Z_3 & M_3 \\ Z_3 & -M_3 \end{bmatrix}, \begin{bmatrix} Z_3 & M_3 \\ -Z_3 & M_3 \end{bmatrix}, \begin{bmatrix} Z_4 & M_4 \\ Z_4 & -M_4 \end{bmatrix}, \begin{bmatrix} Z_4 & M_4 \\ -Z_4 & M_4 \end{bmatrix},$$
$$\begin{bmatrix} Z_3 & M_3 \\ jZ_3 & -jM_3 \end{bmatrix}, \begin{bmatrix} Z_3 & M_3 \\ -jZ_3 & jM_3 \end{bmatrix}, \begin{bmatrix} Z_4 & M_4 \\ jZ_4 & -jM_4 \end{bmatrix}, \begin{bmatrix} Z_2 & M_2 \\ -jZ_2 & jM_2 \end{bmatrix},$$
$$\bigcup_{m=1,m\neq n}^{4} \bigcup_{n=1}^{4} \begin{bmatrix} Z_m & X_n \\ Z_m & -X_n \end{bmatrix}, \bigcup_{m=1,m\neq n}^{4} \bigcup_{n=1}^{4} \begin{bmatrix} Z_m & M_n \\ -Z_m & M_n \end{bmatrix},$$
$$\left. \bigcup_{m=1,m\neq n}^{4} \bigcup_{n=1}^{4} \begin{bmatrix} Z_m & M_j \\ -jZ_m & jM_j \end{bmatrix}, \bigcup_{m=1,m\neq n}^{4} \bigcup_{n=1}^{4} \begin{bmatrix} Z_m & M_n \\ jZ_m & -jM_n \end{bmatrix} \right\},$$

wherein $Z_1$ and $Z_2$ are both 4×3 matrixes, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_4$; $Z_2$ is composed of any 3 columns in $X_3$, $Z_3$ is composed of any 3 columns in $X_2$, and $Z_4$ is composed of any 3 columns in $X_4$; $M_1$ and $M_2$ are both 4×2 matrixes, $M_1$ is composed of any 3 columns in $Z_1$, and $M_2$ is composed of any 3 columns in $Z_2$; $M_3$ and $M_4$ are both 4×2 matrixes, $M_3$ is composed of any 3 columns in $Z_3$, and $M_4$ is composed of any 3 columns in $Z_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

The codebook is in a form of multiplying a fixed matrix M by another codebook C, and the product of M and C is equivalent to the codebook.

Exchange of any columns of the codebook is an equivalent transformation of the codebook, and exchange of any rows of the codebook is an equivalent transformation of the codebook.

Multiplying of any one column of the codebook and any constant coefficient with a module of 1 is an equivalent transformation of the codebook.

The product obtained by multiplying all the columns of the codebook by any non-zero constant coefficient is equivalent to the codebook.

According to another aspect of the present invention, a mobile terminal is provided.

The mobile terminal according to the present invention comprises: a first acquiring module, configured to acquire channel information; a determination module, configured to determine, in a codebook space, an RI and a PMI corresponding to the channel information according to the channel information, and a sending module, configured to send the RI and the PMI to a base station.

According to still another aspect of the present invention, a base station is provided.

The base station according to the present invention comprises: a second acquiring module, configured to acquire an RI and a PMI; and a precoding module, configured to perform downlink precoding operation according to the RI and the PMI.

According to still another aspect of the present invention, an LTE-A system is provided. The LTE-A system comprises: the above mobile terminal and the above base station.

By way of the present invention, a terminal acquires channel information, an RI and a PMI corresponding to the channel information are determined in a codebook space according to the channel information, and the RI and the PMI are sent to a base station, the above-mentioned problem that the codebook with 4 antennae in the LTE system can not realize the channel information feedback in the LTE-A using 8 antennae is solved, and the effects of improving the throughput of an LTE-A system and the frequency spectrum efficiency thereof are achieved.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The present invention will be further illustrated hereinafter in conjunction with the exemplary embodiments and accompanying drawings. It shall be noted that the embodiments in the present invention and the characteristics in the embodiments can be mutually combined if no conflict occurs.

Figure 1:
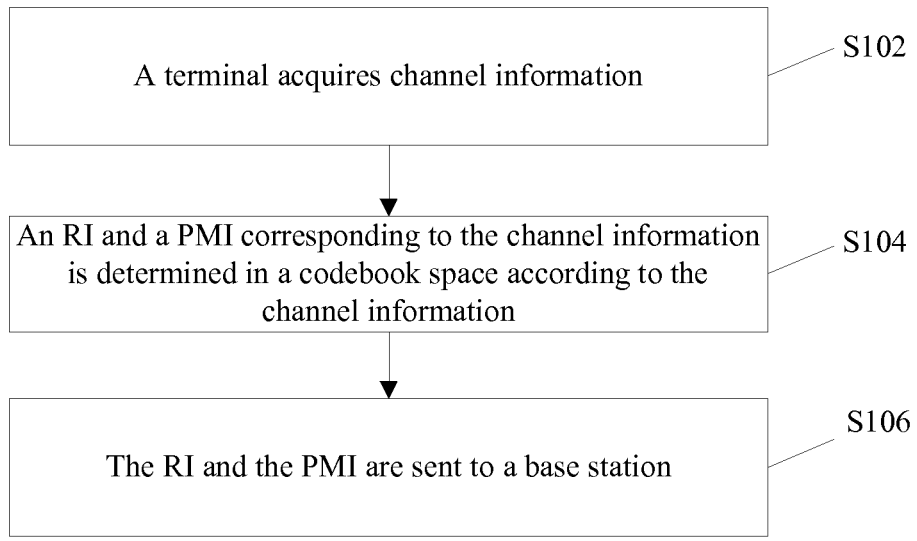
FIG. 1 is a flow chart of a method for sending channel information according to an embodiment of the present invention.

According to an embodiment of the present invention, a method for sending channel information is provided. FIG. 1 is a flow chart of the method for sending channel information according to the embodiment of the present invention. As shown in FIG. 1, the method comprises:

S102: a terminal acquires channel information.

S104: an RI and a PMI corresponding to the channel information are determined in a codebook space according to the channel information, and S106: the RI and the PMI are sent to a base station.

Through the steps above, an RI and a PMI corresponding to the channel information are determined in a codebook space according to the channel information acquired by the terminal, and the RI and the PMI are sent to a base station, thus the above-mentioned problem that the codebook space with 4 antennae in the LTE system in related art can not realize the channel information feedback in the LTE-A using 8 antennae is solved, and the effects of improving the throughput of an LTE-A system and the frequency spectrum efficiency thereof are achieved.

Preferably, after S106, the above methods also comprises: the base station acquires the RI and the PMI, and performs a downlink precoding operation according to the RI and the PMI. Through the precoding operation in the preferable embodiment, the precoding is performed according to the acquired RI and PMI, thus improving the frequency spectrum efficiency of the LTE-A system.

Preferably, S102 comprises: the mobile terminal acquires the channel information by estimating the channel according to the downlink pilot frequency. Through the acquiring operation in the preferable embodiment, the mobile terminal acquires the channel information by estimating the channel according to the downlink pilot frequency, in this way, the fully-developed existing channel estimation technology can be used without changing the existing method, and further saves the development cost.

Preferably, the codebook space above is stored on the mobile terminal and the base station simultaneously. Through the preferable embodiment, the uniform codebook space stored in the base station and the codebook space ensures the sending accuracy of the channel information.

Preferably, when RI is equal to 8, any 2, 4, 8 or 16 matrixes are selected from the following set to construct a codebook space $\Re_8$;

the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$

$$\begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$

$$\left. \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\},$$

wherein $X_1 = \begin{bmatrix} 1 & 1 & 1 & 1 \\ 1 & j & -1 & -j \\ 1 & -1 & 1 & -1 \\ 1 & -j & -1 & j \end{bmatrix}$, $X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix}$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$m \neq n, m \in \{1, 2, 3, 4\}, n \in \{1, 2, 3, 4\}$.

Preferably, codebook space $\Re_8$, composed of two code words, is constructed through one of the following construction methods.

Construction method 1:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix} \right\};$$

Construction method 2:

$$\Re_8 = \left\{ \begin{bmatrix} X_1 & X_1 \\ X_1 & -X_1 \end{bmatrix}, \begin{bmatrix} X_1 & X_1 \\ jX_1 & -jX_1 \end{bmatrix} \right\}; \text{ or }$$

$$\Re_8 = \left\{ \begin{bmatrix} X_2 & X_2 \\ X_2 & -X_2 \end{bmatrix}, \begin{bmatrix} X_2 & X_2 \\ jX_2 & -jX_2 \end{bmatrix} \right\}.$$

It shall be noted that Construction method 1 and Construction method 2 can be realized by selecting any two from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix} \right\}.$$

Codebook space $\Re_8$, composed of 4 code words, can be determined through one of the following construction methods.

Construction method 3:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix} \right\};$$

Construction method 4:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix} \right\}.$$

It shall be noted that Construction method 3 and Construction method 4 can be realized by selecting any 4 from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix} \right\}.$$

Codebook space $\Re_8$, composed of 8 code words, can be determined through one of the following construction methods.

Construction method 5:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_m & X_n \\ X_m & -X_n \end{bmatrix}, \begin{bmatrix} X_m & X_n \\ X_m & -X_n \end{bmatrix}, \begin{bmatrix} X_m & X_n \\ X_m & -X_n \end{bmatrix}, \begin{bmatrix} X_m & X_n \\ X_m & -X_n \end{bmatrix} \right\};$$

$(m \neq n, m \in \{1, 2, 3, 4\}, n \in \{1, 2, 3, 4\})$

Construction method 6:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_1 & X_2 \\ X_1 & -X_2 \end{bmatrix}, \begin{bmatrix} X_2 & X_3 \\ X_2 & -X_3 \end{bmatrix}, \begin{bmatrix} X_3 & X_4 \\ X_3 & -X_4 \end{bmatrix}, \begin{bmatrix} X_4 & X_1 \\ X_4 & -X_1 \end{bmatrix} \right\};$$

Construction method 7:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_1 & X_2 \\ X_1 & -X_2 \end{bmatrix}, \begin{bmatrix} X_1 & X_3 \\ X_1 & -X_3 \end{bmatrix}, \begin{bmatrix} X_1 & X_4 \\ X_1 & -X_4 \end{bmatrix}, \begin{bmatrix} X_2 & X_3 \\ X_2 & -X_3 \end{bmatrix} \right\}.$$

It shall be noted that Construction Methods 5-7 can be realized by selecting any 4 from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix} \right\}$$

and any 4 from the set $$\left\{ \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\}.$$

Wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

=By way of the preferable embodiment, the codebook space-based channel information feedback method in the case of Rank8 (RI=8) is provided, thus improving the precoding performance of the system in the case of Rank8 and achieving the effects of improving the throughput and system frequency spectrum efficiency.

Preferably, the codebook space $\Re_8$ is in the form of the multiplying of a fixed matrix M and another codebook space C8, and the product of M and C8 is equivalent to the codebook space $\Re_8$, namely the codebook space $\Re_8$ can be in the form of the multiplying of a fixed matrix M and another codebook C8. Although the codebook space actually used is C8, it is required to multiply C8 and the matrix M to obtain the final code words, which is equivalent to the use of codebook space $\Re_8$.

Preferably, the exchange of any columns or any rows of the codebook space is the equivalent transformation of the codebook space, namely, the codebook space $\Re_8$ can be the equivalent transformation of any column exchange, and the column exchange, which will not change the characteristics of the codebook space, is an equivalent transformation. Codebook space $\Re_8$ can also be the equivalent transformation of row exchange.

Preferably, the multiplying of any one column of the codebook space and any constant coefficient with a module of 1 is the equivalent transformation of the codebook space, namely, the multiplying of any one column of $\Re_8$ and any constant coefficient with a module of 1 is an equivalent transformation of the codebook space $\Re_8$.

Preferably, the product obtained by multiplying all the columns of the codebook space and any non-zero constant coefficient is equivalent to the codebook space. Namely, the multiplying of all the columns of $\Re_8$ and any non-zero constant coefficient is an equivalent transformation of the codebook space $\Re_8$.

Preferably, when RI is equal to 7, any 2, 4, 8 or 16 matrixes are selected from the following set to construct a codebook space $\Re_7$:

the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$

$$\begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix},$$

$$\begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix},$$

$$\begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix}, \begin{bmatrix} Z_4 & X_4 \\ -jZ_4 & jX_4 \end{bmatrix},$$

$$\bigcup_{m=1,m\neq n}^{4}\bigcup_{n=1}^{4}\begin{bmatrix} Z_m & X_n \\ Z_m & -X_n \end{bmatrix}, \bigcup_{m=1,m\neq n}^{4}\bigcup_{n=1}^{4}\begin{bmatrix} Z_m & X_n \\ -Z_m & X_n \end{bmatrix},$$

$$\left. \bigcup_{m=1,m\neq n}^{4}\bigcup_{n=1}^{4}\begin{bmatrix} Z_m & X_n \\ -jZ_m & jX_n \end{bmatrix}, \bigcup_{m=1,m\neq n}^{4}\bigcup_{n=1}^{4}\begin{bmatrix} Z_m & X_n \\ jZ_m & -jX_n \end{bmatrix} \right\}.$$

Codebook space $\Re_7$, composed of two code words, can be constructed through one of the following construction methods.

Construction method 8:

$$\Re_7 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix} \right\};$$

Construction method 9:

$$\Re_7 = \left\{ \begin{bmatrix} Z_1 & X_1 \\ -Z_1 & X_1 \end{bmatrix}, \begin{bmatrix} Z_2 & X_2 \\ -Z_2 & X_2 \end{bmatrix} \right\};$$

Construction method 10:

$$\Re_7 = \left\{ \begin{bmatrix} Z_1 & X_1 \\ Z_1 & -X_1 \end{bmatrix}, \begin{bmatrix} Z_1 & X_1 \\ jZ_1 & -jX_1 \end{bmatrix} \right\};$$

Construction method 11:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix} \right\};$$

Construction method 12:

$$\Re_7 = \left\{ \begin{bmatrix} Z_1 & X_1 \\ Z_1 & -X_1 \end{bmatrix}, \begin{bmatrix} Z_1 & X_1 \\ -jZ_1 & jX_1 \end{bmatrix} \right\};$$

Construction method 13:

$$\Re_7 = \left\{ \begin{bmatrix} Z_1 & X_1 \\ -Z_1 & X_1 \end{bmatrix}, \begin{bmatrix} Z_1 & X_1 \\ jZ_1 & -jX_1 \end{bmatrix} \right\};$$

wherein, in Construction methods 8 to 13, $Z_1$ and $Z_2$ are 4×3 matrixes, $Z_1$ is composed of any 3 columns in $X_1$, and $Z_2$ composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

It shall be noted that, the Construction methods 8-13 are realized by selecting any 2 matrixes from the set $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$

$$\left. \begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix} \right\}.$$

Codebook space $\Re_7$, composed of 4 code words, can be constructed through one of the following construction methods.

Construction method 14:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix}, \begin{bmatrix} Z_2 & X_2 \\ -Z_2 & X_2 \end{bmatrix}, \begin{bmatrix} Z_2 & X_2 \\ -jZ_2 & jX_2 \end{bmatrix} \right\};$$

Construction method 15:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix}, \begin{bmatrix} Z_2 & X_2 \\ Z_2 & -X_2 \end{bmatrix}, \begin{bmatrix} Z_2 & X_2 \\ jZ_2 & -jX_2 \end{bmatrix} \right\};$$

wherein, in Construction methods 14 and 15, $Z_1$ is composed of any 3 columns in $X_1$, and $Z_2$ is composed of any 3 columns in $X_2$; or $Z_1$ is composed of any 3 columns in $X_2$, and $Z_2$ is composed of any 3 columns in $X_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 16:

$$\Re_7 = \left\{ \begin{bmatrix} Z_1 & X_1 \\ -Z_1 & X_1 \end{bmatrix}, \begin{bmatrix} Z_1 & X_1 \\ -Z_1 & X_1 \end{bmatrix}, \begin{bmatrix} Z_2 & X_2 \\ -Z_2 & X_2 \end{bmatrix}, \begin{bmatrix} Z_2 & X_2 \\ Z_2 & -X_2 \end{bmatrix} \right\};$$

wherein, in Construction method 16, $Z_1$ is composed of any 3 columns in $X_1$, and $Z_2$ is composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix}.$$

It shall be noted that Construction methods 14, 15 and 16 are realized by selecting any 4 matrixes from the set $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \begin{bmatrix} Z_1 & X_1 \\ jZ_1 & -jX_1 \end{bmatrix}, \right.$$
$$\left. \begin{bmatrix} Z_1 & X_1 \\ -jZ_1 & jX_1 \end{bmatrix} \begin{bmatrix} Z_2 & X_2 \\ jZ_2 & -jX_2 \end{bmatrix} \begin{bmatrix} Z_2 & X_2 \\ -jZ_2 & jX_2 \end{bmatrix} \right\}.$$

Construction method 17:

$$\Re_7 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\};$$

Construction method 18:

$$\Re_7 = \left\{ \begin{bmatrix} Z_1 & X_1 \\ -Z_1 & X_1 \end{bmatrix}, \begin{bmatrix} Z_2 & X_2 \\ -Z_2 & X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\};$$

wherein, in Construction methods 17 and 18, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$, and $Z_4$ is composed of any 3 columns in $X_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

It shall be noted that Construction methods 17 and 18 are realized by selecting any 4 matrixes from the set $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \right.$$
$$\left. \begin{bmatrix} Z_2 & X_2 \\ -Z_2 & X_2 \end{bmatrix}, \begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix} \right\}.$$

By way of the preferable embodiment, the codebook space-based channel information feedback method in the case of Rank7 (RI=7) is provided, thus improving the precoding performance of the system in the case of Rank7 and achieving the effects of improving the throughput and system frequency spectrum efficiency.

Preferably, codebook space $\Re_7$ is in the form of the multiplying of a fixed matrix M and another codebook C7, and the product of M and C7 is equivalent to the codebook space $\Re_7$, namely the codebook space $\Re_7$ can be in the form of the multiplying of a fixed matrix M and another codebook C7. Although the codebook space actually used is C7, it is required to multiply C7 and the matrix M to obtain the final code words, which is equivalent to the use of codebook space $\Re_7$.

Preferably, the exchange of any columns or any rows of the codebook space is the equivalent transformation of the codebook space, namely, the codebook space $\Re_7$ can be the equivalent transformation of any column exchange, and the column exchange, which will not change the characteristics of the codebook space, is an equivalent transformation. Codebook space $\Re_7$ can also be the equivalent transformation of row exchange.

Preferably, the multiplying of any one column of the codebook space and any constant coefficient with a module of 1 is the equivalent transformation of the codebook space, namely, the multiplying of any one column of $\Re_7$ and any constant coefficient with a module of 1 is equivalent transformation of the codebook space $\Re_7$.

Preferably, the product obtained by multiplying all the columns of the codebook space and any non-zero constant coefficient is equivilant to the codebook space. Namely, the multiplying of all the columns of $\Re_7$ and any non-zero constant coefficient is an equivalent transformation of the codebook space $\Re_7$.

Preferably, when RI is equal to 6, any 2, 4, 8 or 16 matrixes are selected from the following to construct codebook space $\Re_6$:

the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \right.$$

$$\begin{bmatrix} Z_2 & Z_2 \\ jZ_2 & -jZ_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$

$$\left. \bigcup_{m=1, m\neq n}^{4} \bigcup_{n=1}^{4} \begin{bmatrix} Z_m & Z_n \\ Z_m & -Z_n \end{bmatrix}, \bigcup_{m=1, m\neq n}^{4} \bigcup_{n=1}^{4} \begin{bmatrix} Z_m & Z_n \\ jZ_m & -jZ_n \end{bmatrix} \right\}.$$

Codebook space $\Re_6$, composed of two code words, can be constructed by selecting any 2 matrixes from the set below, the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix} \right\}.$$

Codebook space $\Re_6$ is determined through one of the following construction methods.

Construction method 19:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix} \right\};$$

Construction method 20:

$$\Re_6 = \left\{ \begin{bmatrix} Z_1 & Z_1 \\ Z_1 & -Z_1 \end{bmatrix}, \begin{bmatrix} Z_1 & Z_1 \\ jZ_1 & -jZ_1 \end{bmatrix} \right\};$$

wherein, in Construction methods 19 and 20, $Z_1$ and $Z_2$ are 4×3 matrixes, $Z_1$ is composed of any 3 columns in $X_1$, and $Z_2$ is composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Codebook space $\Re_6$, composed of 4 code words, can be determined through one of the following construction methods:

Construction method 21:

$$\Re_6 = \left\{ \begin{bmatrix} Z_1 & Z_1 \\ Z_1 & -Z_1 \end{bmatrix}, \begin{bmatrix} Z_1 & Z_1 \\ jZ_1 & -jZ_1 \end{bmatrix}, \begin{bmatrix} Z_2 & Z_2 \\ Z_2 & -Z_2 \end{bmatrix}, \begin{bmatrix} Z_2 & Z_2 \\ jZ_2 & -jZ_2 \end{bmatrix} \right\};$$

Construction method 22:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix} \right\};$$

wherein, in Construction methods 21 and 22, $Z_1$ and $Z_2$ are 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

=$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix}, X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

By way of the preferable embodiment, the codebook space-based channel information feedback method in the case of Rank6 (RI=6) is provided, thus improving the precoding performance of the system in the case of Rank6 and achieving the effects of improving the throughput and system frequency spectrum efficiency.

Codebook space $\Re_6$, composed of 8 code words, can be determined through one of the following construction methods:

Construction method 23:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \right.$$

-continued $$\left[\begin{array}{cc} Z_1 & Z_1 \\ jZ_1 & -jZ_1 \end{array}\right], \left[\begin{array}{cc} Z_2 & Z_2 \\ jZ_2 & -jZ_2 \end{array}\right], \left[\begin{array}{cc} Z_3 & Z_3 \\ jZ_3 & -jZ_3 \end{array}\right], \left[\begin{array}{cc} Z_4 & Z_4 \\ jZ_4 & -jZ_4 \end{array}\right]\right\}.$$

Construction method 24:

$$\mathfrak{R}_6 = \left\{\left[\begin{array}{cc} Z_1 & Z_1 \\ Z_1 & -Z_1 \end{array}\right], \left[\begin{array}{cc} Z_2 & Z_2 \\ Z_2 & -Z_2 \end{array}\right], \left[\begin{array}{cc} Z_3 & Z_3 \\ Z_3 & -Z_3 \end{array}\right], \left[\begin{array}{cc} Z_4 & Z_4 \\ Z_4 & -Z_4 \end{array}\right],\right.$$
$$\left.\left[\begin{array}{cc} Z_1 & Z_2 \\ Z_1 & -Z_2 \end{array}\right], \left[\begin{array}{cc} Z_1 & Z_4 \\ Z_1 & -Z_4 \end{array}\right], \left[\begin{array}{cc} Z_2 & Z_3 \\ Z_2 & -Z_3 \end{array}\right], \left[\begin{array}{cc} Z_2 & Z_4 \\ Z_2 & -Z_4 \end{array}\right]\right\}.$$

Codebook space $\mathfrak{R}_6$, composed of 16 code words, can be determined through one of the following construction methods:

Construction method 25:

$$\mathfrak{R}_6 = \left\{\left[\begin{array}{cc} Z_1 & Z_1 \\ Z_1 & -Z_1 \end{array}\right], \left[\begin{array}{cc} Z_2 & Z_2 \\ Z_2 & -Z_2 \end{array}\right], \left[\begin{array}{cc} Z_3 & Z_3 \\ Z_3 & -Z_3 \end{array}\right],\right.$$
$$\left[\begin{array}{cc} Z_4 & Z_4 \\ Z_4 & -Z_4 \end{array}\right], \left[\begin{array}{cc} Z_1 & Z_2 \\ Z_1 & -Z_2 \end{array}\right], \left[\begin{array}{cc} Z_1 & Z_4 \\ Z_1 & -Z_4 \end{array}\right], \left[\begin{array}{cc} Z_2 & Z_3 \\ Z_2 & -Z_3 \end{array}\right], \left[\begin{array}{cc} Z_2 & Z_4 \\ Z_2 & -Z_4 \end{array}\right],$$
$$\left[\begin{array}{cc} Z_1 & Z_1 \\ jZ_1 & -jZ_1 \end{array}\right], \left[\begin{array}{cc} Z_2 & Z_2 \\ jZ_2 & -jZ_2 \end{array}\right], \left[\begin{array}{cc} Z_3 & Z_3 \\ jZ_3 & -jZ_3 \end{array}\right], \left[\begin{array}{cc} Z_4 & Z_4 \\ jZ_4 & -jZ_4 \end{array}\right],$$
$$\left.\left[\begin{array}{cc} Z_1 & Z_2 \\ jZ_1 & -jZ_2 \end{array}\right], \left[\begin{array}{cc} Z_1 & Z_4 \\ jZ_1 & -jZ_4 \end{array}\right], \left[\begin{array}{cc} Z_2 & Z_3 \\ jZ_2 & -jZ_3 \end{array}\right], \left[\begin{array}{cc} Z_2 & Z_4 \\ jZ_2 & -jZ_4 \end{array}\right]\right\}.$$

Preferably, codebook space $\mathfrak{R}_6$ is in the form of the multiplying of a fixed matrix M and another codebook C6, and the product of M and C6 is equivalent to the codebook space $\mathfrak{R}_6$, namely the codebook space $\mathfrak{R}_6$ can be in the form of the multiplying of a fixed matrix M and another codebook C6. Although the codebook space actually used is C6, it is required to multiply C6 and the matrix M to obtain the final code words, which is equivalent to the use of codebook space $\mathfrak{R}_6$.

Preferably, the exchange of any columns or any rows of the codebook space is the equivalent transformation of the codebook space, namely, the codebook space $\mathfrak{R}_6$ can be the equivalent transformation of any column exchange, and the column exchange, which will not change the characteristics of the codebook space, is an equivalent transformation. Codebook space $\mathfrak{R}_6$ can also be the equivalent transformation of row exchange.

Preferably, the multiplying of any one column of the codebook space and any constant coefficient with a module of 1 is the equivalent transformation of the codebook space, namely, the multiplying of any one column of $\mathfrak{R}_6$ and any constant coefficient with a module of 1 is an equivalent transformation of the codebook space $\mathfrak{R}_6$.

Preferably, the product obtained by multiplying all the columns of the codebook space and any non-zero constant coefficient is equivalent to the codebook space. Namely, the multiplying of all the columns of $\mathfrak{R}_6$ and any constant coefficient which is not 0 is an equivalent transformation of the codebook space $\mathfrak{R}_6$.

Preferably, when RI is equal to 5, any 2, 4, 8 or 16 matrixes are selected from the following set to construct a codebook space $\mathfrak{R}_5$:

the set is $$\left\{\left[\begin{array}{cc} Z_1 & M_1 \\ Z_1 & -M_1 \end{array}\right], \left[\begin{array}{cc} Z_1 & M_1 \\ -Z_1 & M_1 \end{array}\right], \left[\begin{array}{cc} Z_2 & M_2 \\ Z_2 & -M_2 \end{array}\right],\right.$$
$$\left[\begin{array}{cc} Z_2 & M_2 \\ -Z_2 & M_2 \end{array}\right], \left[\begin{array}{cc} Z_1 & M_1 \\ jZ_1 & -jM_1 \end{array}\right], \left[\begin{array}{cc} Z_1 & M_1 \\ -jZ_1 & jM_1 \end{array}\right],$$
$$\left[\begin{array}{cc} Z_2 & M_2 \\ jZ_2 & -jM_2 \end{array}\right], \left[\begin{array}{cc} Z_2 & M_2 \\ -jZ_2 & jM_2 \end{array}\right], \left[\begin{array}{cc} Z_3 & M_3 \\ Z_3 & -M_3 \end{array}\right], \left[\begin{array}{cc} Z_3 & M_3 \\ -Z_3 & M_3 \end{array}\right],$$
$$\left[\begin{array}{cc} Z_4 & M_4 \\ Z_4 & -M_4 \end{array}\right], \left[\begin{array}{cc} Z_4 & M_4 \\ -Z_4 & M_4 \end{array}\right], \left[\begin{array}{cc} Z_3 & M_3 \\ jZ_3 & -jM_3 \end{array}\right], \left[\begin{array}{cc} Z_3 & M_3 \\ -jZ_3 & jM_3 \end{array}\right],$$
$$\left[\begin{array}{cc} Z_4 & M_4 \\ jZ_4 & -jM_4 \end{array}\right], \left[\begin{array}{cc} Z_2 & M_2 \\ -jZ_2 & jM_2 \end{array}\right], \bigcup_{m=1, m\neq n}^{4} \bigcup_{n=1}^{4} \left[\begin{array}{cc} Z_m & X_n \\ Z_m & -X_n \end{array}\right],$$
$$\bigcup_{m=1, m\neq n}^{4} \bigcup_{n=1}^{4} \left[\begin{array}{cc} Z_m & M_n \\ -Z_m & M_n \end{array}\right], \bigcup_{m=1, m\neq n}^{4} \bigcup_{n=1}^{4} \left[\begin{array}{cc} Z_m & M_j \\ -jZ_m & jM_j \end{array}\right],$$
$$\left.\bigcup_{m=1, m\neq n}^{4} \bigcup_{n=1}^{4} \left[\begin{array}{cc} Z_m & M_n \\ jZ_m & -jM_n \end{array}\right]\right\}.$$

Codebook space $\mathfrak{R}_5$, composed of two code words, is determined through one of the following construction methods:

Preferably, the construction methods below can be realized by selecting any 2 or 4 matrixes from the set $$\left\{\left[\begin{array}{cc} Z_1 & M_1 \\ Z_1 & -M_1 \end{array}\right], \left[\begin{array}{cc} Z_1 & M_1 \\ -Z_1 & M_1 \end{array}\right], \left[\begin{array}{cc} Z_2 & M_2 \\ Z_2 & -M_2 \end{array}\right], \left[\begin{array}{cc} Z_2 & M_2 \\ -Z_2 & M_2 \end{array}\right],\right.$$
$$\left.\left[\begin{array}{cc} Z_1 & M_1 \\ jZ_1 & -jM_1 \end{array}\right], \left[\begin{array}{cc} Z_1 & M_1 \\ -jZ_1 & jM_1 \end{array}\right], \left[\begin{array}{cc} Z_2 & M_2 \\ jZ_2 & -jM_2 \end{array}\right], \left[\begin{array}{cc} Z_2 & M_2 \\ -jZ_2 & jM_2 \end{array}\right]\right\}.$$

Construction method 26:

$$\mathfrak{R}_5 = \left\{\left[\begin{array}{cc} Z_1 & M_1 \\ Z_1 & -M_1 \end{array}\right], \left[\begin{array}{cc} Z_2 & M_2 \\ Z_2 & -M_2 \end{array}\right]\right\};$$

Construction method 27:

$$\mathfrak{R}_5 = \left\{\left[\begin{array}{cc} Z_1 & M_1 \\ -Z_1 & M_1 \end{array}\right], \left[\begin{array}{cc} Z_2 & M_2 \\ -Z_2 & M_2 \end{array}\right]\right\};$$

Construction method 28:

$$\mathfrak{R}_5 = \left\{\left[\begin{array}{cc} Z_1 & M_1 \\ Z_1 & -M_1 \end{array}\right], \left[\begin{array}{cc} Z_1 & M_1 \\ jZ_1 & -jM_1 \end{array}\right]\right\};$$

Construction method 29:

$$\mathfrak{R}_5 = \left\{\left[\begin{array}{cc} Z_1 & M_1 \\ -Z_1 & M_1 \end{array}\right], \left[\begin{array}{cc} Z_1 & M_1 \\ -jZ_1 & jM_1 \end{array}\right]\right\},$$

wherein, $Z_1$ is 4×3 matrix and is composed of any 3 columns in $X_1$; $M_1$ is 4×2 matrix and is composed of any 3 columns in $Z_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix};$$

Construction method 30:

$$\Re_5 = \left\{ \begin{bmatrix} Z_1 & M_1 \\ Z_1 & -M_1 \end{bmatrix}, \begin{bmatrix} Z_1 & M_1 \\ -jZ_1 & jM_1 \end{bmatrix} \right\},$$

wherein, $Z_1$ is 4×3 matrix and is composed of any 3 columns in $X_1$; $M_1$ is 4×2 matrix and is composed of any 3 columns in $Z_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix};$$

Construction method 31:

$$\Re_5 = \left\{ \begin{bmatrix} Z_1 & M_1 \\ -Z_1 & M_1 \end{bmatrix}, \begin{bmatrix} Z_1 & M_1 \\ jZ_1 & -jM_1 \end{bmatrix} \right\};$$

wherein, in Construction methods 23 to 28, $Z_1$ and $Z_2$ are 4×3 matrixes, $Z_1$ is composed of any 3 columns in $X_1$, and $Z_2$ is composed of any 3 columns in $X_2$; $M_1$ and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

Codebook space $\Re_5$, composed of 4 code words, is determined through one of the following construction methods:

Construction method 32:

$$\Re_5 = \left\{ \begin{bmatrix} Z_1 & M_1 \\ -Z_1 & M_1 \end{bmatrix}, \begin{bmatrix} Z_1 & M_1 \\ -jZ_1 & -jM_1 \end{bmatrix}, \begin{bmatrix} Z_2 & M_2 \\ -Z_2 & M_2 \end{bmatrix}, \begin{bmatrix} Z_2 & M_2 \\ -jZ_2 & jM_2 \end{bmatrix} \right\};$$

wherein, $Z_1$ is composed of any 3 columns in $X_1$, and $Z_2$ is composed of any 3 columns in $X_2$; or $X_1$ is composed of any 3 columns in $X_2$, and $Z_2$ is composed of any 3 columns in $X_1$;

$M_1$ and $M_2$ are 4×2 matrixes, $M_1$ is composed of any 3 columns in $Z_1$, and $M_2$ is composed of any 3 columns in $Z_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 33:

$$\Re_5 = \left\{ \begin{bmatrix} Z_1 & M_1 \\ -Z_1 & M_1 \end{bmatrix}, \begin{bmatrix} Z_1 & M_1 \\ -jZ_1 & -jM_1 \end{bmatrix}, \begin{bmatrix} Z_2 & M_2 \\ Z_2 & -M_2 \end{bmatrix}, \begin{bmatrix} Z_2 & M_2 \\ jZ_2 & -jM_2 \end{bmatrix} \right\};$$

wherein, in Construction methods 32 and 33, $Z_1$ is composed of any 3 columns in $X_1$, and $Z_2$ is composed of any 3 columns in $X_2$; or $Z_1$ is composed of any 3 columns in $X_2$, and $Z_2$ is composed of any 3 columns in $X_1$; $M_1$ and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 34:

$$\Re_5 = \left\{ \begin{bmatrix} Z_1 & M_1 \\ -Z_1 & M_1 \end{bmatrix}, \begin{bmatrix} Z_1 & M_1 \\ -Z_1 & M_1 \end{bmatrix}, \begin{bmatrix} Z_2 & M_2 \\ -Z_2 & M_2 \end{bmatrix}, \begin{bmatrix} Z_2 & M_2 \\ Z_2 & -M_2 \end{bmatrix} \right\};$$

wherein, in Construction methods 34, $Z_1$ is composed of any 3 columns in $X_1$, and $Z_2$ is composed of any 3 columns in $X_2$; $M_1$ and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 35:

$$\Re_5 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\};$$

Construction method 36:

$$\Re_5 = \left\{ \begin{bmatrix} Z_1 & M_1 \\ -Z_1 & M_1 \end{bmatrix}, \begin{bmatrix} Z_2 & M_2 \\ -Z_2 & M_2 \end{bmatrix}, \begin{bmatrix} Z_3 & M_3 \\ Z_3 & -M_3 \end{bmatrix}, \begin{bmatrix} Z_4 & M_4 \\ Z_4 & -M_4 \end{bmatrix} \right\};$$

wherein, in Construction methods 35 and 36, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$ and $Z_4$ is composed of any 3 columns in $X_4$; $M_1$ and $M_2$ are 4×2 matrixes, $M_1$ is composed of any 3 columns in $Z_1$, and $M_2$ is composed of any 3 columns in $Z_2$; $M_3$ and $M_4$ are 4×2 matrixes, $M_3$ is composed of any 3 columns in $Z_3$, and $M_4$ is composed of any 3 columns in $$Z_4 \cdot X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

By way of the preferable embodiment, the codebook space-based channel information feedback method in the case of Rank5 (RI=5) is provided, thus improving the precoding performance of the system in the case of Rank5 and achieving the effects of improving the throughput and system frequency spectrum efficiency.

Preferably, codebook space $\Re_5$ is in the form of the multiplying of a fixed matrix M and another codebook C5, and the product of M and C5 is equivalent to the codebook space $\Re_5$, namely the codebook space $\Re_5$ can be in the form of the multiplying of a fixed matrix M and another codebook C5. Although the codebook space actually used is C5, it is required to multiply C5 and the matrix M to obtain the final code words, which is equivalent to the use of codebook space $\Re_5$.

Preferably, the exchange of any columns or any rows of the codebook space is the equivalent transformation of the codebook space, namely, the codebook space $\Re_5$ can be the equivalent transformation of any column exchange, and the column exchange, which will not change the characteristics of the codebook space, is an equivalent transformation. Codebook space $\Re_5$ can also be the equivalent transformation of row exchange.

Preferably, the multiplying of any one column of the codebook space and any constant coefficient with a module of 1 is the equivalent transformation of the codebook space, namely, the multiplying of any one column of $\Re_5$ and any constant coefficient with a module of 1 is an equivalent transformation of the codebook space $\Re_5$.

Preferably, the product obtained by multiplying all the columns of the codebook space and any non-zero constant coefficient is equivalent to the codebook space. Namely, the multiplying of all the columns of $\Re_5$ and any non-zero constant coefficient is an equivalent transformation of the codebook space $\Re_5$.

Figure 2:
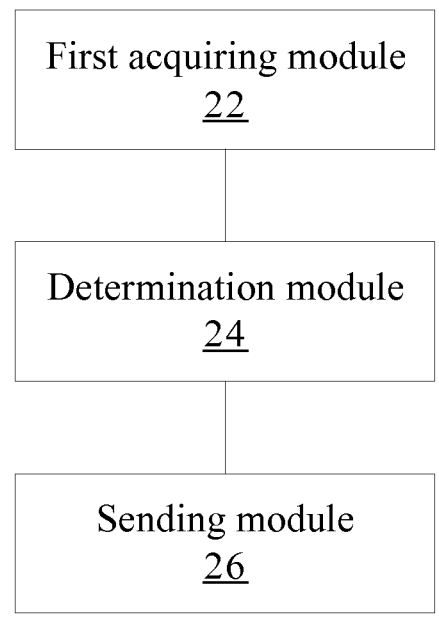
FIG. 2 is a structural block diagram of a mobile terminal according to an embodiment of the present invention.

A mobile terminal is provided according to an embodiment of the present invention. FIG. 2 is the structural block diagram of the mobile terminal. As shown in FIG. 2, the mobile terminal comprises: a first acquiring module 22, a determination module 24 and a sending module 26. The structure above will be detailed as follows.

The first acquiring module 22 is configured to acquire channel information; the determination module 24, coupled with the first acquiring module 22, is configured to determine, in a codebook space, an RI and a PMI corresponding to the channel information according to the channel information acquired by the first acquiring module 22; and the sending module 26, coupled with the determination module 24, is configured to sent the RI and the PMI determined by the determination module 24 to a base station.

Figure 3:
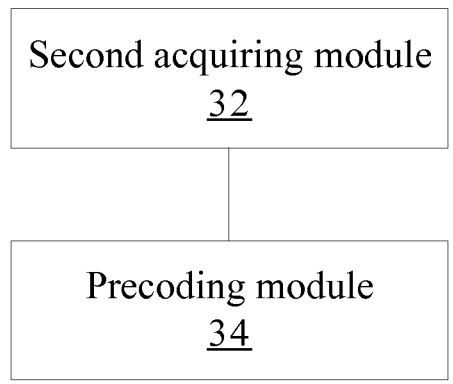
FIG. 3 is a structural block diagram of a base station according to an embodiment of the present invention.

According to an embodiment of the present invention, a base station is provided. FIG. 3 is the structural block diagram of the base station. As shown in FIG. 3, the base station comprises: a second acquiring module 32 and a precoding module 34, the second acquiring module 32 is configured to acquire an RI and a PMI;

the precoding module 34, coupled with the second acquiring module 32, is configured to perform downlink precoding operation according to the RI and PMI acquired by the first acquiring module 32.

The mobile terminal and base station use the same codebook space, and the specific contents of which are as follows.

Preferably, when RI is equal to 8, any 2, 4, 8 or 16 matrixes are selected from the following set to construct a codebook space $\Re_8$:

the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$

$$\begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$

$$\left. \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\},$$

wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix}$$

-continued $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}},$$

$$q_4 = \frac{1-i}{\sqrt{2}}, m \neq n, m \in \{1, 2, 3, 4\}, n \in \{1, 2, 3, 4\}.$$

Preferably, codebook space $\Re_8$, composed of two code words, is constructed through one of the following construction methods.

Construction method 1:

$$\Re_8 = \left\{ \begin{bmatrix} X_1 & X_1 \\ X_1 & -X_1 \end{bmatrix}, \begin{bmatrix} X_1 & X_1 \\ jX_1 & -jX_1 \end{bmatrix} \right\}; \text{ or}$$

$$\Re_8 = \left\{ \begin{bmatrix} X_2 & X_2 \\ X_2 & -X_2 \end{bmatrix}, \begin{bmatrix} X_2 & X_2 \\ jX_2 & -jX_2 \end{bmatrix} \right\}.$$

Construction method 2:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix} \right\};$$

It shall be noted that Construction method 1 and Construction method 2 can be realized by selecting any two from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix} \right\}.$$

Codebook space $\Re_8$, composed of 4 code words, can be determined through one of the following construction methods.

Construction method 3:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix} \right\};$$

Construction method 4:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix} \right\}.$$

It shall be noted that Construction method 3 and Construction method 4 can be realized by selecting any 4 from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$
$$\left. \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix} \right\}.$$

Codebook space $\Re_8$, composed of 8 code words, can be determined through one of the following construction methods.

Construction method 5:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \right.$$
$$\left. \begin{bmatrix} X_m & X_n \\ X_m & -X_n \end{bmatrix}, \begin{bmatrix} X_m & X_n \\ X_m & -X_n \end{bmatrix}, \begin{bmatrix} X_m & X_n \\ X_m & -X_n \end{bmatrix}, \begin{bmatrix} X_m & X_n \\ X_m & -X_n \end{bmatrix} \right\};$$

$(m \neq n, m \in \{1, 2, 3, 4\}, n \in \{1, 2, 3, 4\})$

Construction method 6:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \right.$$
$$\left. \begin{bmatrix} X_1 & X_2 \\ X_1 & -X_2 \end{bmatrix}, \begin{bmatrix} X_2 & X_3 \\ X_2 & -X_3 \end{bmatrix}, \begin{bmatrix} X_3 & X_4 \\ X_3 & -X_4 \end{bmatrix}, \begin{bmatrix} X_4 & X_1 \\ X_4 & -X_1 \end{bmatrix} \right\};$$

Construction method 7:

$$\Re_8 = \left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_3 & X_3 \\ X_3 & -X_3 \end{bmatrix}, \begin{bmatrix} X_4 & X_4 \\ X_4 & -X_4 \end{bmatrix}, \right.$$
$$\left. \begin{bmatrix} X_1 & X_2 \\ X_1 & -X_2 \end{bmatrix}, \begin{bmatrix} X_1 & X_3 \\ X_1 & -X_3 \end{bmatrix}, \begin{bmatrix} X_1 & X_4 \\ X_1 & -X_4 \end{bmatrix}, \begin{bmatrix} X_2 & X_3 \\ X_2 & -X_3 \end{bmatrix} \right\}.$$

It shall be noted that Construction Methods 5-7 can be realized by selecting any 4 from the set $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$
$$\left. \begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix} \right\}$$

and any 4 from the set $$\left\{ \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\}.$$

Wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix},$$

$$X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}},$$

$$q_2 = \frac{-1+i}{\sqrt{2}},$$

$$q_3 = \frac{-1-i}{\sqrt{2}},$$

$$q_4 = \frac{1-i}{\sqrt{2}}.$$

By way of the preferable embodiment, the codebook space-based channel information feedback method in the case of Rank8 (RI=8) is provided, thus improving the precoding performance of the system in the case of Rank8 and achieving the effects of improving the throughput and system frequency spectrum efficiency.

Preferably, the codebook space $\Re_8$ is in the form of the multiplying of a fixed matrix M and another codebook space C8, and the product of M and C8 is equivalent to the codebook space $\Re_8$, namely the codebook space $\Re_8$ can be in the form of the multiplying of a fixed matrix M and another codebook C8. Although the codebook space actually used is C8, it is required to multiply C8 and the matrix M to obtain the final code words, which is equivalent to the use of codebook space $\Re_8$.

Preferably, the exchange of any columns or any rows of the codebook space is the equivalent transformation of the codebook space, namely, the codebook space $\Re_8$ can be the equivalent transformation of any column exchange, and the column exchange, which will not change the characteristics of the codebook space, is an equivalent transformation. Codebook space $\Re_8$ can also be the equivalent transformation of row exchange.

Preferably, the multiplying of any one column of the codebook space and any constant coefficient with a module of 1 is the equivalent transformation of the codebook space, namely, the multiplying of any one column of $\Re_8$ and any constant coefficient with a module of 1 is an equivalent transformation of the codebook space $\Re_8$.

Preferably, the product obtained by multiplying all the columns of the codebook space and any non-zero constant coefficient is equivalent to the codebook space. Namely, the multiplying of all the columns of $\Re_8$ and any non-zero constant coefficient is an equivalent transformation of the codebook space $\Re_8$.

Preferably, when RI is equal to 7, any 2, 4, 8 or 16 matrixes are selected from the following set to construct a codebook space $\Re_7$:

the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$

$$\begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix},$$

$$\begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix},$$

$$\begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix}, \begin{bmatrix} Z_4 & X_4 \\ -jZ_4 & jX_4 \end{bmatrix},$$

$$\bigcup_{m=1, m\neq n}^{4} \bigcup_{n=1}^{4} \begin{bmatrix} Z_m & X_n \\ Z_m & -X_n \end{bmatrix}, \bigcup_{m=1, m\neq n}^{4} \bigcup_{n=1}^{4} \begin{bmatrix} Z_m & X_n \\ -Z_m & X_n \end{bmatrix},$$

$$\left. \bigcup_{m=1, m\neq n}^{4} \bigcup_{n=1}^{4} \begin{bmatrix} Z_m & X_n \\ -jZ_m & jX_n \end{bmatrix}, \bigcup_{m=1, m\neq n}^{4} \bigcup_{n=1}^{4} \begin{bmatrix} Z_m & X_n \\ jZ_m & -jX_n \end{bmatrix} \right\}.$$

Codebook space $\Re_7$, composed of two code words, can be constructed through one of the following construction methods.

Construction method 8:

$$\Re_7 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix} \right\};$$

Construction method 9:

$$\Re_7 = \left\{ \begin{bmatrix} Z_1 & X_1 \\ -Z_1 & X_1 \end{bmatrix}, \begin{bmatrix} Z_2 & X_2 \\ -Z_2 & X_2 \end{bmatrix} \right\};$$

Construction method 10:

$$\Re_7 = \left\{ \begin{bmatrix} Z_1 & X_1 \\ Z_1 & -X_1 \end{bmatrix}, \begin{bmatrix} Z_1 & X_1 \\ jZ_1 & -jX_1 \end{bmatrix} \right\};$$

Construction method 11:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix} \right\};$$

Construction method 12:

$$\Re_7 = \left\{ \begin{bmatrix} Z_1 & X_1 \\ Z_1 & -X_1 \end{bmatrix}, \begin{bmatrix} Z_1 & X_1 \\ -jZ_1 & jX_1 \end{bmatrix} \right\};$$

Construction method 13:

$$\Re_7 = \left\{ \begin{bmatrix} Z_1 & X_1 \\ -Z_1 & X_1 \end{bmatrix}, \begin{bmatrix} Z_1 & X_1 \\ jZ_1 & -jX_1 \end{bmatrix} \right\};$$

wherein, in Construction methods 8 to 13, $Z_1$ and $Z_2$ are 4×3 matrixes, $Z_1$ is composed of any 3 columns in $X_1$, and $Z_2$ is composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix},$$

$$X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}},$$

$$q_2 = \frac{-1+i}{\sqrt{2}},$$

$$q_3 = \frac{-1-i}{\sqrt{2}},$$

$$q_4 = \frac{1-i}{\sqrt{2}}.$$

It shall be noted that, the Construction methods 8-13 are realized by selecting any 2 matrixes from the set $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$
$$\left. \begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix} \right\}.$$

Codebook space $\Re_7$, composed of 4 code words, can be constructed through one of the following construction methods.

Construction method 14:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix}, \begin{bmatrix} Z_2 & X_2 \\ -Z_2 & X_2 \end{bmatrix}, \begin{bmatrix} Z_2 & X_2 \\ -jZ_2 & jX_2 \end{bmatrix} \right\};$$

Construction method 15:

$$\Re_7 = \left\{ \begin{bmatrix} Z_1 & X_1 \\ -Z_1 & X_1 \end{bmatrix}, \begin{bmatrix} Z_1 & X_1 \\ -jZ_1 & jX_1 \end{bmatrix}, \begin{bmatrix} Z_2 & X_2 \\ Z_2 & -X_2 \end{bmatrix}, \begin{bmatrix} Z_2 & X_2 \\ jZ_2 & -jX_2 \end{bmatrix} \right\};$$

wherein, in Construction methods 14 and 15, $Z_1$ is composed of any 3 columns in $X_1$, and $Z_2$ is composed of any 3 columns in $X_2$; or $Z_1$ is composed of any 3 columns in $X_2$, and $Z_2$ is composed of any 3 columns in $X_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix},$$

$$X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}},$$

$$q_2 = \frac{-1+i}{\sqrt{2}},$$

$$q_3 = \frac{-1-i}{\sqrt{2}},$$

$$q_4 = \frac{1-i}{\sqrt{2}};$$

Construction method 16:

$$\Re_7 = \left\{ \begin{bmatrix} Z_1 & X_1 \\ -Z_1 & X_1 \end{bmatrix}, \begin{bmatrix} Z_1 & X_1 \\ -Z_1 & X_1 \end{bmatrix}, \begin{bmatrix} Z_2 & X_2 \\ -Z_2 & X_2 \end{bmatrix}, \begin{bmatrix} Z_2 & X_2 \\ Z_2 & -X_2 \end{bmatrix} \right\};$$

wherein, in Construction method 16, $Z_1$ is composed of any 3 columns in $X_1$, and $Z_2$ is composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix},$$

$$X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix}.$$

It shall be noted that Construction methods 14, 15 and 16 are realized by selecting any 4 matrixes from the set $$\left\{ \begin{bmatrix} Z_1 & X_1 \\ Z_1 & -X_1 \end{bmatrix} \begin{bmatrix} Z_1 & X_1 \\ -Z_1 & X_1 \end{bmatrix} \begin{bmatrix} Z_2 & X_2 \\ Z_2 & -X_2 \end{bmatrix} \begin{bmatrix} Z_2 & X_2 \\ -Z_2 & X_2 \end{bmatrix} \begin{bmatrix} Z_1 & X_1 \\ jZ_1 & -jX_1 \end{bmatrix} \right.$$
$$\left. \begin{bmatrix} Z_1 & X_1 \\ -jZ_1 & jX_1 \end{bmatrix} \begin{bmatrix} Z_2 & X_2 \\ jZ_2 & -jX_2 \end{bmatrix} \begin{bmatrix} Z_2 & X_2 \\ -jZ_2 & jX_2 \end{bmatrix} \right\}.$$

Construction method 17:

$$\Re_7 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\};$$

Construction method 18:

$$\Re_7 = \left\{ \begin{bmatrix} Z_1 & X_1 \\ -Z_1 & X_1 \end{bmatrix}, \begin{bmatrix} Z_2 & X_2 \\ -Z_2 & X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\},$$

wherein, in Construction methods 17 and 18, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$, and $Z_4$ is composed of any 3 columns in $X_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

It shall be noted that Construction methods 17 and 18 are realized by selecting any 4 matrixes from the set $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix} \right\}.$$

By way of the preferable embodiment, the codebook space-based channel information feedback method in the case of Rank7 (RI=7) is provided, thus improving the precoding performance of the system in the case of Rank7 and achieving the effects of improving the throughput and system frequency spectrum efficiency.

Preferably, codebook space $\Re_7$ is in the form of the multiplying of a fixed matrix M and another codebook C7, and the product of M and C7 is equivalent to the codebook space $\Re_7$, namely the codebook space $\Re_7$ can be in the form of the multiplying of a fixed matrix M and another codebook C7. Although the codebook space actually used is C7, it is required to multiply C7 and the matrix M to obtain the final code words, which is equivalent to the use of codebook space $\Re_7$.

Preferably, the exchange of any columns or any rows of the codebook space is the equivalent transformation of the codebook space, namely, the codebook space $\Re_7$ can be the equivalent transformation of any column exchange, and the column exchange, which will not change the characteristics of the codebook space, is an equivalent transformation. Codebook space $\Re_7$ can also be the equivalent transformation of row exchange.

Preferably, the multiplying of any one column of the codebook space and any constant coefficient with a module of 1 is the equivalent transformation of the codebook space, namely, the multiplying of any one column of $\Re_7$ and any constant coefficient with a module of 1 is an equivalent transformation of the codebook space $\Re_7$.

Preferably, the product obtained by multiplying all the columns of the codebook space and any non-zero constant coefficient is equivalent to the codebook space. Namely, the multiplying of all the columns of $\Re_7$ and any non-zero constant coefficient is an equivalent transformation of the codebook space $\Re_7$.

Preferably, when RI is equal to 6, any 2, 4, 8 or 16 matrixes are selected from the following to construct codebook space $\Re_6$.

the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix}, \bigcup_{m=1,m}^{4} \bigcup_{n \neq 1}^{4} \begin{bmatrix} Z_m & Z_n \\ Z_m & -Z_n \end{bmatrix}, \bigcup_{m=1,m}^{4} \bigcup_{n \neq 1}^{4} \begin{bmatrix} Z_m & Z_n \\ jZ_m & -jZ_n \end{bmatrix} \right\}.$$

Codebook space $\Re_6$, composed of two code words, can be constructed by selecting any 2 matrixes from the set below, the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix} \right\}.$$

Codebook space $\Re_6$ is determined through one of the following construction methods.

Construction method 19:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix} \right\};$$

Construction method 20:

$$\Re_6 = \left\{ \begin{bmatrix} Z_1 & Z_1 \\ Z_1 & -Z_1 \end{bmatrix}, \begin{bmatrix} Z_1 & Z_1 \\ jZ_1 & -jZ_1 \end{bmatrix} \right\};$$

wherein, in Construction methods 19 and 20, $Z_1$ and $Z_2$ are 4×3 matrixes, $Z_1$ is composed of any 3 columns in $X_1$, and $Z_2$ is composed of any 3 columns in $X_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

-continued $$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Codebook space $\Re_6$, composed of 4 code words, can be determined through one of the following construction methods:

Construction method 21:

$$\Re_6 = \left\{ \begin{bmatrix} Z_1 & Z_1 \\ Z_1 & -Z_1 \end{bmatrix}, \begin{bmatrix} Z_1 & Z_1 \\ jZ_1 & -jZ_1 \end{bmatrix}, \begin{bmatrix} Z_2 & Z_2 \\ Z_2 & -Z_2 \end{bmatrix}, \begin{bmatrix} Z_2 & Z_2 \\ jZ_2 & -jZ_2 \end{bmatrix} \right\};$$

Construction method 22:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix} \right\};$$

wherein, in Construction methods 21 and 22, $Z_1$ and $Z_2$ are 4×3 matrixes, $Z_1$ is composed of any 3 columns in $X_1$, and $Z_2$ is composed of any 3 columns in $Z_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

=$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix}, X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

By way of the preferable embodiment, the codebook space-based channel information feedback method in the case of Rank6 (RI=6) is provided, thus improving the precoding performance of the system in the case of Rank6 and achieving the effects of improving the throughput and system frequency spectrum efficiency.

Codebook space $\Re_6$, composed of 8 code words, can be determined through one of the following construction methods:

Construction method 23:

$$\Re_6 = \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix},$$

$$\begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix}.$$

Construction method 24:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \right.$$

$$\left. \begin{bmatrix} Z_1 & Z_2 \\ Z_1 & -Z_2 \end{bmatrix}, \begin{bmatrix} Z_1 & Z_4 \\ Z_1 & -Z_4 \end{bmatrix}, \begin{bmatrix} Z_2 & Z_3 \\ Z_2 & -Z_3 \end{bmatrix}, \begin{bmatrix} Z_2 & Z_4 \\ Z_2 & -Z_4 \end{bmatrix} \right\}.$$

Codebook space $\Re_6$, composed of 16 code words, can be determined through one of the following construction methods:

Construction method 25:

$$\Re_6 = \left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_3 & Z_3 \\ Z_3 & -Z_3 \end{bmatrix}, \right.$$

$$\begin{bmatrix} Z_4 & Z_4 \\ Z_4 & -Z_4 \end{bmatrix}, \begin{bmatrix} Z_1 & Z_2 \\ Z_1 & -Z_2 \end{bmatrix}, \begin{bmatrix} Z_1 & Z_4 \\ Z_1 & -Z_4 \end{bmatrix}, \begin{bmatrix} Z_2 & Z_3 \\ Z_2 & -Z_3 \end{bmatrix}, \begin{bmatrix} Z_2 & Z_4 \\ Z_2 & -Z_4 \end{bmatrix},$$

$$\begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$

$$\left. \begin{bmatrix} Z_1 & Z_2 \\ jZ_1 & -jZ_2 \end{bmatrix}, \begin{bmatrix} Z_1 & Z_4 \\ jZ_1 & -jZ_4 \end{bmatrix}, \begin{bmatrix} Z_2 & Z_3 \\ jZ_2 & -jZ_3 \end{bmatrix}, \begin{bmatrix} Z_2 & Z_4 \\ jZ_2 & -jZ_4 \end{bmatrix} \right\}.$$

Preferably, codebook space $\Re_6$ is in the form of the multiplying of a fixed matrix M and another codebook C6, and the product of M and C6 is equivalent to the codebook space $\Re_6$, namely the codebook space $\Re_6$ can be in the form of the multiplying of a fixed matrix M and another codebook C6. Although the codebook space actually used is C6, it is required to multiply C6 and the matrix M to obtain the final code words, which is equivalent to the use of codebook space $\Re_6$.

Preferably, the exchange of any columns or any rows of the codebook space is the equivalent transformation of the codebook space, namely, the codebook space $\Re_6$ can be the equivalent transformation of any column exchange, and the column exchange, which will not change the characteristics of the codebook space, is an equivalent transformation. Codebook space $\Re_6$ can also be the equivalent transformation of row exchange.

Preferably, the multiplying of any one column of the codebook space and any constant coefficient with a module of 1 is the equivalent transformation of the codebook space, namely, the multiplying of any one column of $\Re_6$ and any constant coefficient with a module of 1 is an equivalent transformation of the codebook space $\Re_6$.

Preferably, the product obtained by multiplying all the columns of the codebook space and any non-zero constant coefficient is equivalent to the codebook space. Namely, the multiplying of all the columns of $\Re_6$ and any constant coefficient which is not 0 is an equivalent transformation of the codebook space $\Re_6$.

Preferably, when RI is equal to 5, any 2, 4, 8 or 16 matrixes are selected from the following set to construct a codebook space $\Re_5$;
the set is $$\left\{ \begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \right.$$

$$\begin{bmatrix} Z_2 & M_2 \\ -Z_2 & M_2 \end{bmatrix}, \begin{bmatrix} Z_1 & M_1 \\ jZ_1 & -jM_1 \end{bmatrix}, \begin{bmatrix} Z_1 & M_1 \\ -jZ_1 & jM_1 \end{bmatrix},$$

-continued $$\begin{bmatrix} Z_2 & M_2 \\ jZ_2 & -jM_2 \end{bmatrix}, \begin{bmatrix} Z_2 & M_2 \\ -jZ_2 & jM_2 \end{bmatrix}, \begin{bmatrix} Z_3 & M_3 \\ Z_3 & -M_3 \end{bmatrix}\begin{bmatrix} Z_3 & M_3 \\ -Z_3 & M_3 \end{bmatrix},$$

$$\begin{bmatrix} Z_4 & M_4 \\ Z_4 & -M_4 \end{bmatrix}, \begin{bmatrix} Z_4 & M_4 \\ -Z_4 & M_4 \end{bmatrix}, \begin{bmatrix} Z_3 & M_3 \\ jZ_3 & -jM_3 \end{bmatrix},$$

$$\begin{bmatrix} Z_3 & M_3 \\ -jZ_3 & jM_3 \end{bmatrix}, \begin{bmatrix} Z_4 & M_4 \\ jZ_4 & -jM_4 \end{bmatrix}, \begin{bmatrix} Z_2 & M_2 \\ -jZ_2 & jM_2 \end{bmatrix},$$

$$\bigcup_{m=1,m\ne n}^{4}\bigcup_{n=1}^{4}\begin{bmatrix} Z_m & X_n \\ Z_m & -X_n \end{bmatrix}, \bigcup_{m=1,m\ne n}^{4}\bigcup_{n=1}^{4}\begin{bmatrix} Z_m & M_n \\ -Z_m & M_n \end{bmatrix},$$

$$\bigcup_{m=1,m\ne n}^{4}\bigcup_{n=11}^{4}\begin{bmatrix} Z_m & M_j \\ -jZ_m & jM_j \end{bmatrix}, \bigcup_{m=1,m\ne n}^{4}\bigcup_{n=1}^{4}\begin{bmatrix} Z_m & M_n \\ jZ_m & -jM_n \end{bmatrix}\Bigg\}.$$

Codebook space $\mathfrak{R}_5$, composed of two code words, is determined through one of the following construction methods:

Preferably, the construction methods below can be realized by selecting any 2 or 4 matrixes from the set $$\Bigg\{\begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \begin{bmatrix} Z_2 & M_2 \\ -Z_2 & M_2 \end{bmatrix},$$

$$\begin{bmatrix} Z_1 & M_1 \\ -jZ_1 & -jM_1 \end{bmatrix}\begin{bmatrix} Z_1 & M_1 \\ jZ_1 & jM_1 \end{bmatrix}, \begin{bmatrix} Z_2 & M_2 \\ jZ_2 & -jM_2 \end{bmatrix}, \begin{bmatrix} Z_2 & M_2 \\ -jZ_2 & jM_2 \end{bmatrix}\Bigg\}.$$

Construction method 26:

$$\mathfrak{R}_5 = \Bigg\{\begin{bmatrix} Z_1 & M_1 \\ Z_1 & -M_1 \end{bmatrix}, \begin{bmatrix} Z_2 & M_2 \\ Z_2 & -M_2 \end{bmatrix}\Bigg\};$$

Construction method 27:

$$\mathfrak{R}_5 = \Bigg\{\begin{bmatrix} Z_1 & M_1 \\ -Z_1 & M_1 \end{bmatrix}, \begin{bmatrix} Z_2 & M_2 \\ -Z_2 & M_2 \end{bmatrix}\Bigg\};$$

Construction method 28:

$$\mathfrak{R}_5 = \Bigg\{\begin{bmatrix} Z_1 & M_1 \\ Z_1 & -M_1 \end{bmatrix}, \begin{bmatrix} Z_1 & M_1 \\ jZ_1 & -jM_1 \end{bmatrix}\Bigg\};$$

Construction method 29:

$$\mathfrak{R}_5 = \Bigg\{\begin{bmatrix} Z_1 & M_1 \\ -Z_1 & M_1 \end{bmatrix}, \begin{bmatrix} Z_1 & M_1 \\ -jZ_1 & jM_1 \end{bmatrix}\Bigg\},$$

wherein, $Z_1$ is 4×3 matrix and is composed of any 3 columns in $X_1$; $M_1$ is 4×2 matrix and is composed of any 3 columns in $Z_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix};$$

Construction method 30:

$$\mathfrak{R}_5 = \Bigg\{\begin{bmatrix} Z_1 & M_1 \\ Z_1 & -M_1 \end{bmatrix}, \begin{bmatrix} Z_1 & M_1 \\ -jZ_1 & jM_1 \end{bmatrix}\Bigg\},$$

wherein, $Z_1$ is 4×3 matrix and is composed of any 3 columns in $X_1$; $M_1$ is 4×2 matrix and is composed of any 3 columns in $Z_1$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix};$$

Construction method 31:

$$\mathfrak{R}_5 = \Bigg\{\begin{bmatrix} Z_1 & M_1 \\ -Z_1 & M_1 \end{bmatrix}, \begin{bmatrix} Z_1 & M_1 \\ jZ_1 & -jM_1 \end{bmatrix}\Bigg\};$$

wherein, in Construction methods 23 to 28, $Z_1$ and $Z_2$ are 4×3 matrixes, $Z_1$ is composed of any 3 columns in $X_1$, and $Z_2$ is composed of any 3 columns in $X_2$, $M_1$ and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}}.$$

Codebook space $\mathfrak{R}_5$, composed of 4 code words, is determined through one of the following construction methods:

Construction method 32:

$$\mathfrak{R}_5 = \Bigg\{\begin{bmatrix} Z_1 & M_1 \\ -Z_1 & M_1 \end{bmatrix}, \begin{bmatrix} Z_1 & M_1 \\ -jZ_1 & jM_1 \end{bmatrix}, \begin{bmatrix} Z_2 & M_2 \\ -Z_2 & M_2 \end{bmatrix}, \begin{bmatrix} Z_2 & M_2 \\ -jZ_2 & jM_2 \end{bmatrix}\Bigg\};$$

wherein, $Z_1$ is composed of any 3 columns in $X_1$, and $Z_2$ is composed of any 3 columns in $Z_2$; or $Z_1$ is composed of any 3 columns in $X_2$, and $Z_2$ is composed of any 3 columns in $X_1$;

$M_1$ and $M_2$ are 4×2 matrixes, $M_1$ is composed of any 3 columns in $Z_1$, and $M_2$ is composed of any 3 columns in $Z_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 33:

$$\Re_5 = \left\{ \begin{bmatrix} Z_1 & M_1 \\ -Z_1 & M_1 \end{bmatrix}, \begin{bmatrix} Z_1 & M_1 \\ -jZ_1 & jM_1 \end{bmatrix}, \begin{bmatrix} Z_2 & M_2 \\ Z_2 & -M_2 \end{bmatrix}, \begin{bmatrix} Z_2 & M_2 \\ jZ_2 & -jM_2 \end{bmatrix} \right\};$$

wherein, in Construction methods 32 and 33, $Z_1$ is composed of any 3 columns in $X_1$, and $Z_2$ is composed of any 3 columns in $X_2$; or $Z_1$ is composed of any 3 columns in $X_2$ and $Z_2$ is composed of any 3 columns in $X_1$; $M_1$, and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 34:

$$\Re_5 = \left\{ \begin{bmatrix} Z_1 & M_1 \\ -Z_1 & M_1 \end{bmatrix}, \begin{bmatrix} Z_1 & M_1 \\ -Z_1 & M_1 \end{bmatrix}, \begin{bmatrix} Z_2 & M_2 \\ -Z_2 & M_2 \end{bmatrix}, \begin{bmatrix} Z_2 & M_2 \\ Z_2 & -M_2 \end{bmatrix} \right\};$$

wherein, in Construction methods 34, $Z_1$ is composed of any 3 columns in $X_1$, and $Z_2$ is composed of any 3 columns in $X_2$, $M_1$ and $M_2$ are 4×2 matrixes, $M_1$ is composed of any 3 columns in $Z_1$, and $M_2$ is composed of any 3 columns in $Z_2$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

Construction method 35:

$$\Re_5 = \left\{ \begin{bmatrix} Z_1 & X_1 \\ Z_1 & -X_1 \end{bmatrix}, \begin{bmatrix} Z_2 & X_2 \\ Z_2 & -X_2 \end{bmatrix}, \begin{bmatrix} Z_3 & X_3 \\ Z_3 & -X_3 \end{bmatrix}, \begin{bmatrix} Z_4 & X_4 \\ Z_4 & -X_4 \end{bmatrix} \right\};$$

Construction method 36:

$$\Re_5 = \left\{ \begin{bmatrix} Z_1 & M_1 \\ -Z_1 & M_1 \end{bmatrix}, \begin{bmatrix} Z_2 & M_2 \\ -Z_2 & M_2 \end{bmatrix}, \begin{bmatrix} Z_3 & M_3 \\ Z_3 & -M_3 \end{bmatrix}, \begin{bmatrix} Z_4 & M_4 \\ Z_4 & -M_4 \end{bmatrix} \right\};$$

wherein, in Construction methods 35 and 36, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X^4$; or $Z_1$ is composed of any 3 columns in $X_1$, $Z_2$ is composed of any 3 columns in $X_3$, $Z_3$ is composed of any 3 columns in $X_2$, and $Z_{24}$ is composed of any 3 columns in $X_4$; $M_1$ and $M_2$ are 4×2 matrixes, $M_1$ is composed of any 3 columns in $Z_1$, and $M_2$ is composed of any 3 columns in $Z_2$; $M_3$ and $M_4$ are 4×2 matrixes, $M_3$ is composed of any 3 columns in $Z_3$, and $M_4$ is composed of any 3 columns in $Z_4$.

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

By way of the preferable embodiment, the codebook space-based channel information feedback method in the case of Rank5 (RI=5) is provided, thus improving the precoding performance of the system in the case of Rank5 and achieving the effects of improving the throughput and system frequency spectrum efficiency.

Preferably, codebook space $\Re_5$ is in the form of the multiplying of a fixed matrix M and another codebook C5, and the product of M and C5 is equivalent to the codebook space $\Re_5$, namely the codebook space $\Re_5$ can be in the form of the multiplying of a fixed matrix M and another codebook C5. Although the codebook space actually used is C5, it is required to multiply C5 and the matrix M to obtain the final code words, which is equivalent to the use of codebook space $\Re_5$.

Preferably, the exchange of any columns or any rows of the codebook space is the equivalent transformation of the codebook space, namely, the codebook space $\Re_5$ can be the equivalent transformation of any column exchange, and the column exchange, which will not change the characteristics of the codebook space, is an equivalent transformation. Codebook space $\Re_5$ can also be the equivalent transformation of row exchange.

Preferably, the multiplying of any one column of the codebook space and any constant coefficient with a module of 1 is the equivalent transformation of the codebook space, namely, the multiplying of any one column of $\Re_5$ and any constant coefficient with a module of 1 is an equivalent transformation of the codebook space $\Re_5$.

Preferably, the product obtained by multiplying all the columns of the codebook space and any non-zero constant coefficient is equivalent to the codebook space. Namely, the multiplying of all the columns of $\Re_5$ and any non-zero constant coefficient is an equivalent transformation of the codebook space $\Re_5$.

Figure 4:
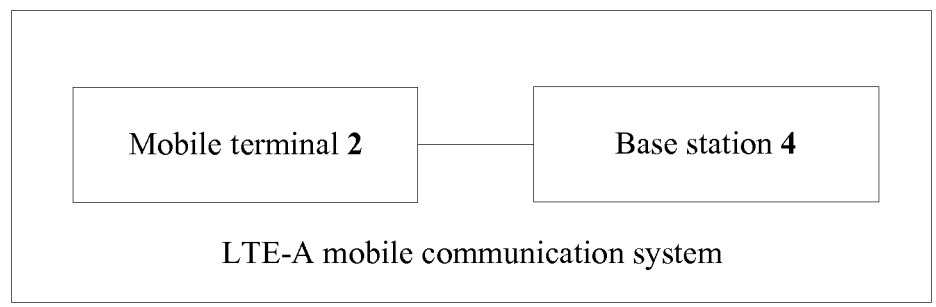
FIG. 4 is a structural block diagram of an LTE-A system according to an embodiment of the present invention.

An LTE-A system is provided according to an embodiment of the present invention. FIG. 4 is the structural block diagram of the LTE-A system. As shown in FIG. 4, the system comprises a mobile terminal 2 as shown in FIG. 2 and a base station 4 as shown in FIG. 3. The detailed structures of the mobile terminal 2 and the base station 4 are as shown in FIG. 2 and FIG. 3, and details will not be given herein.

By way of the embodiments above, a terminal acquires the channel information; an RI and a PMI corresponding to the channel information is determined in a codebook space according to the channel information; and the RI and PMI are sent to a base station, the problem that the codebook with 4 antennae in the LTE system can not realize the channel information feedback in the LTE-A using 8 antennae, and the effects of improving the throughput of an LTE-A system and the frequency spectrum efficiency thereof is achieved.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for sending channel information, comprising:
a mobile terminal acquiring channel information;
according to the channel information, determining, in a codebook space, a Rank Indicator (RI) and a Precoding Matrix Indicator (PMI) corresponding to the channel information; and
sending the RI and the PMI to a base station;
wherein:
when the RI is equal to 8, a codebook space $\Re_8$ is constructed by selecting any 2, 4, 8 or 16 matrixes from a set as follows: the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$

$$\begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$

$$\bigcup_{m=1, m\neq n}^{4} \bigcup_{n=1}^{4} \begin{bmatrix} X_m & X_n \\ X_m & -X_n \end{bmatrix}, \bigcup_{m=1, m\neq n}^{4} \bigcup_{n=1}^{4} \begin{bmatrix} X_m & X_n \\ jX_m & -jX_n \end{bmatrix} \right\},$$

wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 7, a codebook space $\Re_7$ is constructed by selecting any 2, 4, 8 or 16 matrixes from a set as follows: the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \begin{bmatrix} Z_1 & X_1 \\ jZ_1 & -jX_1 \end{bmatrix}, \right.$$

$$\begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix}, \begin{bmatrix} Z_3 & X_3 \\ Z_3 & -X_3 \end{bmatrix}, \begin{bmatrix} Z_3 & X_3 \\ -Z_3 & X_3 \end{bmatrix},$$

$$\begin{bmatrix} Z_4 & X_4 \\ Z_4 & -X_4 \end{bmatrix}, \begin{bmatrix} Z_4 & X_4 \\ -Z_4 & X_4 \end{bmatrix}, \begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix},$$

$$\begin{bmatrix} Z_4 & X_4 \\ -jZ_4 & jX_4 \end{bmatrix}, \bigcup_{m=1, m\neq n}^{4} \bigcup_{n=1}^{4} \begin{bmatrix} Z_m & X_n \\ Z_m & -X_n \end{bmatrix}, \bigcup_{m=1, m\neq n}^{4} \bigcup_{n=1}^{4} \begin{bmatrix} Z_m & X_n \\ -Z_m & X_n \end{bmatrix},$$

$$\bigcup_{m=1, m\neq n}^{4} \bigcup_{n=1}^{4} \begin{bmatrix} Z_m & X_n \\ -jZ_m & jX_n \end{bmatrix}, \bigcup_{m=1, m\neq n}^{4} \bigcup_{n=1}^{4} \begin{bmatrix} Z_m & X_n \\ jZ_m & -jX_n \end{bmatrix} \right\},$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 6, a codebook space $\Re_6$ is constructed by selecting any 2, 4, 8 or 16 matrixes from a set as follows: the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \right.$$

$$\begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$

$$\left. \bigcup_{m=1, m \neq n}^{4} \bigcup_{n=1}^{4} \begin{bmatrix} Z_m & Z_n \\ Z_m & -Z_n \end{bmatrix}, \bigcup_{m=1, m \neq n}^{4} \bigcup_{n=1}^{4} \begin{bmatrix} Z_m & Z_n \\ jZ_m & -jZ_n \end{bmatrix} \right\},$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix}, X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix};$$

and/or, when the RI is equal to 5, a codebook space $\Re_5$ is constructed by selecting any 2, 4, 8 or 16 matrixes from a set as follows, the set is $$\left\{ \begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \begin{bmatrix} Z_2 & M_2 \\ -Z_2 & M_2 \end{bmatrix}, \begin{bmatrix} Z_1 & M_1 \\ jZ_1 & -jM_1 \end{bmatrix}, \right.$$

$$\begin{bmatrix} Z_1 & M_1 \\ -jZ_1 & jM_1 \end{bmatrix}, \begin{bmatrix} Z_2 & M_2 \\ jZ_2 & -jM_2 \end{bmatrix}, \begin{bmatrix} Z_2 & M_2 \\ -jZ_2 & jM_2 \end{bmatrix}, \begin{bmatrix} Z_3 & M_3 \\ Z_3 & -M_3 \end{bmatrix},$$

$$\begin{bmatrix} Z_3 & M_3 \\ -Z_3 & M_3 \end{bmatrix}, \begin{bmatrix} Z_4 & M_4 \\ Z_4 & -M_4 \end{bmatrix}, \begin{bmatrix} Z_4 & M_4 \\ -Z_4 & M_4 \end{bmatrix}, \begin{bmatrix} Z_3 & M_3 \\ jZ_3 & -jM_3 \end{bmatrix},$$

$$\begin{bmatrix} Z_3 & M_3 \\ -jZ_3 & jM_3 \end{bmatrix}, \begin{bmatrix} Z_4 & M_4 \\ jZ_4 & -jM_4 \end{bmatrix}, \begin{bmatrix} Z_2 & M_2 \\ -jZ_2 & jM_2 \end{bmatrix},$$

$$\bigcup_{m=1, m \neq n}^{4} \bigcup_{n=1}^{4} \begin{bmatrix} Z_m & X_n \\ Z_m & -X_n \end{bmatrix}, \bigcup_{m=1, m \neq n}^{4} \bigcup_{n=1}^{4} \begin{bmatrix} Z_m & M_n \\ -Z_m & M_n \end{bmatrix},$$

$$\left. \bigcup_{m=1, m \neq n}^{4} \bigcup_{n=1}^{4} \begin{bmatrix} Z_m & M_j \\ -jZ_m & jM_j \end{bmatrix}, \bigcup_{m=1, m \neq n}^{4} \bigcup_{n=1}^{4} \begin{bmatrix} Z_m & M_n \\ jZ_m & -jM_n \end{bmatrix} \right\}$$

wherein $Z_1$ and $Z_2$ are both 4×3 matrixes, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$, and $Z_4$ is composed of any 3 columns in $X_4$; $M_1$ and $M_2$ are both 4×2 matrixes, $M_1$ is composed of any 3 columns in $Z_1$, and $M_2$ is composed of any 3 columns in $Z_2$; $M_3$ and $M_4$ are both 4×2 matrixes, $M_3$ is composed of any 3 columns in $Z_3$, and $M_4$ is composed of any 3 columns in $Z_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

2. The method according to claim 1, wherein after the step of sending the RI and the PMI to the base station, the method further comprises:
the base station acquiring the RI and the PMI; and
performing downlink precoding operation according to the RI and the PMI.

3. The method according to claim 2, wherein the codebook space is stored in both the mobile terminal and the base station.

4. The method according to claim 1, wherein
the codebook is in a form of multiplying a fixed matrix M by another codebook C, and the product of M and C is equivalent to the codebook.

5. The method according to claim 1, wherein
exchange of any columns of the codebook is an equivalent transformation of the codebook, and exchange of any rows of the codebook is an equivalent transformation of the codebook.

6. The method according to claim 1, wherein
multiplying of any one column of the codebook and any constant coefficient with a module of 1 is an equivalent transformation of the codebook.

7. The method according to claim 1, wherein
the product obtained by multiplying all the columns of the codebook by any non-zero constant coefficient is equivalent to the codebook.

8. A mobile terminal, comprising a hardware processor configured to execute the following modules:
a first acquiring module, configured to acquire channel information;
a determination module, configured to determine, in a codebook space, a Rank Indicator (RI) and a Precoding Matrix Indicator (PMI) corresponding to the channel information according to the channel information, and a sending module, configured to send the RI and the PMI to a base station;

wherein:

when the RI is equal to 8, a codebook space $\Re_8$ is constructed by selecting any 2, 4, 8 or 16 matrixes from a set as follows: the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \begin{bmatrix} X_3 & X_3 \\ X_3 & -X_3 \end{bmatrix}, \right.$$
$$\begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$
$$\left. \bigcup_{m=1, m \neq n}^{4} \bigcup_{n=1}^{4} \begin{bmatrix} X_m & X_n \\ X_m & -X_n \end{bmatrix}, \bigcup_{m=1, m \neq n}^{4} \bigcup_{n=1}^{4} \begin{bmatrix} X_m & X_n \\ jX_m & -jX_n \end{bmatrix} \right\},$$

wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 7, a codebook space $\Re_7$ is constructed by selecting any 2, 4, 8 or 16 matrixes from a set as follows: the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$
$$\begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix},$$
$$\begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix},$$
$$\begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix}, \begin{bmatrix} Z_4 & X_4 \\ -jZ_4 & jX_4 \end{bmatrix},$$
$$\left. \bigcup_{m=1, m \neq n}^{4} \bigcup_{n=1}^{4} \begin{bmatrix} Z_m & X_n \\ Z_m & -X_n \end{bmatrix}, \bigcup_{m=1, m \neq n}^{4} \bigcup_{n=1}^{4} \begin{bmatrix} Z_m & X_n \\ -Z_m & X_n \end{bmatrix}, \right.$$
$$\left. \bigcup_{m=1, m \neq n}^{4} \bigcup_{n=1}^{4} \begin{bmatrix} Z_m & X_n \\ -jZ_m & jX_n \end{bmatrix}, \bigcup_{m=1, m \neq n}^{4} \bigcup_{n=1}^{4} \begin{bmatrix} Z_m & X_n \\ jZ_m & -jX_n \end{bmatrix} \right\},$$

wherein $Z_1$ and $Z_2$ are both 4×3 matrixes, $Z_1$ is composed of any 3 columns in $X_1$ and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 6, a codebook space $\Re_6$ is constructed by selecting any 2, 4, 8 or 16 matrixes from a set as follows: the set is $$\left\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix}, \right.$$
$$\begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$
$$\left. \bigcup_{m=1, m \neq n}^{4} \bigcup_{n=1}^{4} \begin{bmatrix} Z_m & Z_n \\ Z_m & -Z_n \end{bmatrix}, \bigcup_{m=1, m \neq n}^{4} \bigcup_{n=1}^{4} \begin{bmatrix} Z_m & Z_n \\ jZ_m & -jZ_n \end{bmatrix} \right\},$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix}, X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix};$$

and/or when the RI is equal to 5, a codebook space $\Re_5$ is constructed by selecting any 2, 4, 8 or 16 matrixes from a set as follows, the set is $$\left\{ \begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \begin{bmatrix} Z_2 & M_2 \\ -Z_2 & M_2 \end{bmatrix}, \right.$$

$$\begin{bmatrix} Z_1 & M_1 \\ jZ_1 & -jM_1 \end{bmatrix}, \begin{bmatrix} Z_1 & M_1 \\ -jZ_1 & jM_1 \end{bmatrix}, \begin{bmatrix} Z_2 & M_2 \\ jZ_2 & -jM_2 \end{bmatrix}, \begin{bmatrix} Z_2 & M_2 \\ -jZ_2 & jM_2 \end{bmatrix},$$

$$\begin{bmatrix} Z_3 & M_3 \\ Z_3 & -M_3 \end{bmatrix}, \begin{bmatrix} Z_3 & M_3 \\ -Z_3 & M_3 \end{bmatrix}, \begin{bmatrix} Z_4 & M_4 \\ Z_4 & -M_4 \end{bmatrix}, \begin{bmatrix} Z_4 & M_4 \\ -Z_4 & M_4 \end{bmatrix},$$

$$\begin{bmatrix} Z_3 & M_3 \\ jZ_3 & -jM_3 \end{bmatrix}, \begin{bmatrix} Z_3 & M_3 \\ -jZ_3 & jM_3 \end{bmatrix}, \begin{bmatrix} Z_4 & M_4 \\ jZ_4 & -jM_4 \end{bmatrix}, \begin{bmatrix} Z_2 & M_2 \\ -jZ_2 & jM_2 \end{bmatrix},$$

$$\bigcup_{m=1,m\neq n}^{4} \bigcup_{n=1}^{4} \begin{bmatrix} Z_m & X_n \\ Z_m & -X_n \end{bmatrix}, \bigcup_{m=1,m\neq n}^{4} \bigcup_{n=1}^{4} \begin{bmatrix} Z_m & M_n \\ -Z_m & M_n \end{bmatrix},$$

$$\left. \bigcup_{m=1,m\neq n}^{4} \bigcup_{n=1}^{4} \begin{bmatrix} Z_m & M_j \\ -jZ_m & jM_j \end{bmatrix}, \bigcup_{m=1,m\neq n}^{4} \bigcup_{n=1}^{4} \begin{bmatrix} Z_m & M_n \\ jZ_m & -jM_n \end{bmatrix} \right\},$$

wherein $Z_1$ and $Z_2$ are both 4×3 matrixes, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$, and $Z_4$ is composed of any 3 columns in $X_4$; $M_1$ and $M_2$ are both 4×2 matrixes, $M_1$ is composed of any 3 columns in $Z_1$, and $M_2$ is composed of any 3 columns in $Z_2$; $M_3$ and $M_4$ are both 4×2 matrixes, $M_3$ is composed of any 3 columns in $Z_3$, and $M_4$ is composed of any 3 columns in $Z_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

9. The mobile terminal according to claim 8, wherein the codebook is in a form of multiplying a fixed matrix M by another codebook C, and the product of M and C is equivalent to the codebook.

10. The mobile terminal according to claim 8, wherein exchange of any columns of the codebook is an equivalent transformation of the codebook, and exchange of any rows of the codebook is an equivalent transformation of the codebook.

11. The mobile terminal according to claim 8, wherein multiplying of any one column of the codebook and any constant coefficient with a module of 1 is an equivalent transformation of the codebook.

12. The mobile terminal according to claim 8, wherein the product obtained by multiplying all the columns of the codebook by any non-zero constant coefficient is equivalent to the codebook.

13. A base station, comprising a hardware processor configured to execute the following modules:

a second acquiring module, configured to acquire a Rank Indicator (RI) and a Precoding Matrix Indicator (PMI) corresponding to a codebook space; and a precoding module, configured to perform downlink precoding operation according to the RI and the PMI;

wherein:

when the RI is equal to 8, a codebook space $\Re_8$ is constructed by selecting any 2, 4, 8 or 16 matrixes from a set as follows: the set is $$\left\{ \begin{bmatrix} X_1 & X_1 \\ X_1 & -X_1 \end{bmatrix}, \begin{bmatrix} X_2 & X_2 \\ X_2 & -X_2 \end{bmatrix}, \begin{bmatrix} X_1 & X_1 \\ jX_1 & -jX_1 \end{bmatrix}, \begin{bmatrix} X_2 & X_2 \\ jX_2 & -jX_2 \end{bmatrix}, \right.$$

$$\begin{bmatrix} X_3 & X_3 \\ X_3 & -X_3 \end{bmatrix}, \begin{bmatrix} X_4 & X_4 \\ X_4 & -X_4 \end{bmatrix}, \begin{bmatrix} X_3 & X_3 \\ jX_3 & -jX_3 \end{bmatrix}, \begin{bmatrix} X_4 & X_4 \\ jX_4 & -jX_4 \end{bmatrix},$$

$$\left. \bigcup_{m=1,m\neq n}^{4} \bigcup_{n=1}^{4} \begin{bmatrix} X_m & X_n \\ X_m & -X_n \end{bmatrix}, \bigcup_{m=1,m\neq n}^{4} \bigcup_{n=1}^{4} \begin{bmatrix} X_m & X_n \\ jX_m & -jX_n \end{bmatrix} \right\},$$

wherein $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 7, a codebook space $\Re_7$ is constructed by selecting any 2, 4, 8 or 16 matrixes from a set as follows: the set is $$\left\{ \begin{bmatrix} Z_1 & X_1 \\ Z_1 & -X_1 \end{bmatrix}, \begin{bmatrix} Z_1 & X_1 \\ -Z_1 & X_1 \end{bmatrix}, \begin{bmatrix} Z_2 & X_2 \\ Z_2 & -X_2 \end{bmatrix}, \begin{bmatrix} Z_2 & X_2 \\ -Z_2 & X_2 \end{bmatrix}, \right.$$

$$\begin{bmatrix} Z_1 & X_1 \\ jZ_1 & -jX_1 \end{bmatrix}, \begin{bmatrix} Z_1 & X_1 \\ -jZ_1 & jX_1 \end{bmatrix}, \begin{bmatrix} Z_2 & X_2 \\ jZ_2 & -jX_2 \end{bmatrix}, \begin{bmatrix} Z_2 & X_2 \\ -jZ_2 & jX_2 \end{bmatrix},$$

$$\begin{bmatrix} Z_3 & X_3 \\ Z_3 & -X_3 \end{bmatrix}, \begin{bmatrix} Z_3 & X_3 \\ -Z_3 & X_3 \end{bmatrix}, \begin{bmatrix} Z_4 & X_4 \\ Z_4 & -X_4 \end{bmatrix}, \begin{bmatrix} Z_4 & X_4 \\ -Z_4 & X_4 \end{bmatrix},$$

-continued $$\begin{bmatrix} Z_3 & X_3 \\ jZ_3 & -jX_3 \end{bmatrix}, \begin{bmatrix} Z_3 & X_3 \\ -jZ_3 & jX_3 \end{bmatrix}, \begin{bmatrix} Z_4 & X_4 \\ jZ_4 & -jX_4 \end{bmatrix}, \begin{bmatrix} Z_4 & X_4 \\ -jZ_4 & jX_4 \end{bmatrix},$$

$$\bigcup_{m=1,m\neq n}^{4} \bigcup_{n=1}^{4} \begin{bmatrix} Z_m & X_n \\ Z_m & -X_n \end{bmatrix}, \bigcup_{m=1,m\neq n}^{4} \bigcup_{n=1}^{4} \begin{bmatrix} Z_m & X_n \\ -Z_m & X_n \end{bmatrix},$$

$$\bigcup_{m=1,m\neq n}^{4} \bigcup_{n=1}^{4} \begin{bmatrix} Z_m & X_n \\ -jZ_m & jX_n \end{bmatrix}, \bigcup_{m=1,m\neq n}^{4} \bigcup_{n=1}^{4} \begin{bmatrix} Z_m & X_n \\ jZ_m & -jX_n \end{bmatrix} \Bigg\}$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

and/or, when the RI is equal to 6, a codebook space $\Re_6$ is constructed by selecting any 2, 4, 8, or 16 matrixes from a set as follows: the set is $$\Bigg\{ \begin{bmatrix} Z_1 & Z_1 \\ Z_1 & -Z_1 \end{bmatrix}, \begin{bmatrix} Z_2 & Z_2 \\ Z_2 & -Z_2 \end{bmatrix}, \begin{bmatrix} Z_1 & Z_1 \\ jZ_1 & -jZ_1 \end{bmatrix}, \begin{bmatrix} Z_2 & Z_2 \\ jZ_2 & -jZ_2 \end{bmatrix},$$

$$\begin{bmatrix} Z_3 & Z_3 \\ Z_3 & -Z_3 \end{bmatrix}, \begin{bmatrix} Z_4 & Z_4 \\ Z_4 & -Z_4 \end{bmatrix}, \begin{bmatrix} Z_3 & Z_3 \\ jZ_3 & -jZ_3 \end{bmatrix}, \begin{bmatrix} Z_4 & Z_4 \\ jZ_4 & -jZ_4 \end{bmatrix},$$

$$\bigcup_{m=1,m\neq n}^{4} \bigcup_{n=1}^{4} \begin{bmatrix} Z_m & Z_n \\ Z_m & -Z_n \end{bmatrix}, \bigcup_{m=1,m\neq n}^{4} \bigcup_{n=1}^{4} \begin{bmatrix} Z_m & Z_n \\ jZ_m & -jZ_n \end{bmatrix} \Bigg\}$$

wherein $Z_1$ and $Z_2$ are both 4×3 matrixes, $Z_1$ is composed of any 3 columns in $X_1$, and $Z_2$ is composed of any 3 columns in $X_2$, $$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}};$$

—$Z_3$ is composed of any 3 columns in $X_3$, and $Z_4$ is composed of any 3 columns in $X_4$, $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix};$$

and/or, when the RI is equal to 5, a codebook space $\Re_5$ is constructed by selecting any 2, 4, 8 or 16 matrixes from a set as follows, the set is $$\Bigg\{ \begin{bmatrix} Z_1 & M_1 \\ Z_1 & -M_1 \end{bmatrix}, \begin{bmatrix} Z_1 & M_1 \\ -Z_1 & M_1 \end{bmatrix}, \begin{bmatrix} Z_2 & M_2 \\ Z_2 & -M_2 \end{bmatrix}, \begin{bmatrix} Z_2 & M_2 \\ -Z_2 & M_2 \end{bmatrix},$$

$$\begin{bmatrix} Z_1 & M_1 \\ jZ_1 & -jM_1 \end{bmatrix}, \begin{bmatrix} Z_1 & M_1 \\ -jZ_1 & jM_1 \end{bmatrix}, \begin{bmatrix} Z_2 & M_2 \\ jZ_2 & -jM_2 \end{bmatrix}, \begin{bmatrix} Z_2 & M_2 \\ -jZ_2 & jM_2 \end{bmatrix},$$

$$\begin{bmatrix} Z_3 & M_3 \\ Z_3 & -M_3 \end{bmatrix}, \begin{bmatrix} Z_3 & M_3 \\ -Z_3 & M_3 \end{bmatrix}, \begin{bmatrix} Z_4 & M_4 \\ Z_4 & -M_4 \end{bmatrix}, \begin{bmatrix} Z_4 & M_4 \\ -Z_4 & M_4 \end{bmatrix},$$

$$\begin{bmatrix} Z_3 & M_3 \\ jZ_3 & -jM_3 \end{bmatrix}, \begin{bmatrix} Z_3 & M_3 \\ -jZ_3 & jM_3 \end{bmatrix}, \begin{bmatrix} Z_4 & M_4 \\ jZ_4 & -jM_4 \end{bmatrix}, \begin{bmatrix} Z_2 & M_2 \\ -jZ_2 & jM_2 \end{bmatrix},$$

$$\bigcup_{m=1,m\neq n}^{4} \bigcup_{n=1}^{4} \begin{bmatrix} Z_m & X_n \\ Z_m & -X_n \end{bmatrix}, \bigcup_{m=1,m\neq n}^{4} \bigcup_{n=1}^{4} \begin{bmatrix} Z_m & M_n \\ -Z_m & M_n \end{bmatrix},$$

$$\bigcup_{m=1,m\neq n}^{4} \bigcup_{n=1}^{4} \begin{bmatrix} Z_m & M_j \\ -jZ_m & jM_j \end{bmatrix}, \bigcup_{m=1,m\neq n}^{4} \bigcup_{n=1}^{4} \begin{bmatrix} Z_m & M_n \\ jZ_m & -jM_n \end{bmatrix} \Bigg\},$$

wherein $Z_1$ and $Z_2$ are both 4×3 matrixes, $Z_1$ is composed of any 3 columns in $X_1$, $Z_2$ is composed of any 3 columns in $X_2$, $Z_3$ is composed of any 3 columns in $X_3$, and $Z_4$ is composed of any 3 columns in $X_4$; or $Z_1$ is composed of any 3 columns in $X_1$, $Z_2$ is composed of any 3 columns in $X_3$, $Z_3$ is composed of any 3 columns in $X_2$, and $Z_4$ is composed of any 3 columns in $X_4$; $M_1$ and $M_2$ are both 4×2 matrixes, $M_1$ is composed of any 3 columns in $Z_1$, and $M_2$ is composed of any 3 columns in $Z_2$; $M_3$ and $M_4$ are both 4×2 matrixes, $M_3$ is composed of any 3 columns in $Z_3$, and $M_4$ is composed of any 3 columns in $Z_4$;

$$X_1 = \begin{bmatrix} 1 & 1 & 1 & 1 \\ 1 & j & -1 & -j \\ 1 & -1 & 1 & -1 \\ 1 & -j & -1 & j \end{bmatrix}, X_2 = \begin{bmatrix} 1 & 1 & 1 & 1 \\ q_1 & q_2 & q_3 & q_4 \\ i & -i & i & -i \\ q_2 & q_1 & q_4 & q_3 \end{bmatrix},$$

$$q_1 = \frac{1+i}{\sqrt{2}}, q_2 = \frac{-1+i}{\sqrt{2}}, q_3 = \frac{-1-i}{\sqrt{2}}, q_4 = \frac{1-i}{\sqrt{2}},$$

-continued $$X_3 = \begin{bmatrix} 1 & 1 & 1 & 1 \\ e^{j\frac{\pi}{8}} & e^{j\frac{5\pi}{8}} & e^{j\frac{-7\pi}{8}} & e^{j\frac{-3\pi}{8}} \\ e^{j\frac{2\pi}{8}} & e^{j\frac{10\pi}{8}} & e^{j\frac{-14\pi}{8}} & e^{j\frac{-6\pi}{8}} \\ e^{j\frac{3\pi}{8}} & e^{j\frac{15\pi}{8}} & e^{j\frac{-21\pi}{8}} & e^{j\frac{-9\pi}{8}} \end{bmatrix},$$

$$X_4 = \begin{bmatrix} 1 & 1 & 1 & 1 \\ e^{j\frac{3\pi}{8}} & e^{j\frac{7\pi}{8}} & e^{j\frac{-5\pi}{8}} & e^{j\frac{-\pi}{8}} \\ e^{j\frac{6\pi}{8}} & e^{j\frac{14\pi}{8}} & e^{j\frac{-10\pi}{8}} & e^{j\frac{-2\pi}{8}} \\ e^{j\frac{9\pi}{8}} & e^{j\frac{21\pi}{8}} & e^{j\frac{-15\pi}{8}} & e^{j\frac{-3\pi}{8}} \end{bmatrix}.$$

14. The base station according to claim 13, wherein the codebook is in a form of multiplying a fixed matrix M by another codebook C, and the product of M and C is equivalent to the codebook.

15. The base station according to claim 13, wherein exchange of any columns of the codebook is an equivalent transformation of the codebook, and exchange of any rows of the codebook is an equivalent transformation of the codebook.

16. The base station according to claim 13, wherein multiplying of any one column of the codebook and any constant coefficient with a module of 1 is an equivalent transformation of the codebook.

17. The base station according to claim 13, wherein the product obtained by multiplying all the columns of the codebook by any non-zero constant coefficient is equivalent to the codebook.

18. An LTE-A system, comprising: the mobile terminal according to claim 8 and the base station according to claim 13.

* * * * *